United States Patent [19]

Blomquist et al.

[11] 4,278,381
[45] Jul. 14, 1981

[54] PALLET SHUTTLE SYSTEM

[75] Inventors: Robert E. Blomquist; Charles R. Reynolds, both of Rockford, Ill.

[73] Assignee: White-Sundstrand Machine Tool, Inc., Belvidere, Ill.

[21] Appl. No.: 731,022

[22] Filed: Oct. 8, 1976

[51] Int. Cl.$^3$ .............................................. B25J 9/00
[52] U.S. Cl. .................................... 414/349; 104/36; 104/50; 104/288; 191/23 A; 414/352
[58] Field of Search ............... 104/35, 48, 50, 36, 104/147 R; 105/29 R; 191/23 A; 214/1 BB, 1 BC, 16.4 A; 246/5; 414/349, 352

[56] References Cited

U.S. PATENT DOCUMENTS

| Re. 26,770 | 1/1970 | Lemelson | 29/33 |
|---|---|---|---|
| 2,586,414 | 2/1952 | Barkis | 191/23 A |
| 3,490,389 | 1/1970 | Brown | 104/35 |
| 3,543,392 | 12/1970 | Perry et al. | 29/563 |
| 3,576,540 | 4/1971 | Fair | 340/172.5 |
| 3,756,433 | 9/1973 | Richins | 214/1 BB |
| 3,796,163 | 3/1974 | Meyer et al. | 104/88 |
| 3,796,327 | 3/1974 | Meyer et al. | 214/38 BB |
| 3,799,057 | 3/1974 | Cassel | 214/16.4 A |
| 3,825,245 | 7/1974 | Osburn et al. | 214/1 BC |
| 3,866,484 | 2/1975 | Dreshman | 104/147 R |
| 3,986,617 | 10/1976 | Blomquist | 214/1 BB |
| 4,015,804 | 4/1977 | Dobler et al. | 246/5 |

Primary Examiner—Robert R. Song
Assistant Examiner—Ross Weaver
Attorney, Agent, or Firm—Wegner, Stellman, McCord, Wiles & Wood

[57] ABSTRACT

A shuttle rail assembly, capable of carrying a pair of pallets to which workpieces are fixtured, is mounted on a wheeled vehcile movable along a pair of tracks extending adjacent machine tools and set-up stations. The vehicle is positively driven by a DC motor and pinion, mounted on a adjustable eccentric, which meshes with a toothed rack secured to one of the pair of tracks. A vertical standard extending upward from the vehicle is slidable along power and control electrical buses contained within an enclosed overhead trolley. The shuttle rail assembly includes a pair of rails, extendable to either side of the vehicle by a hydraulic rail motor, mounted on a platform rotatable by a hydraulic index motor to 180° positions when pallets are to be interchanged, and having a 90° latched position during vehicle travel. The vehicle chassis includes a pair of tubular frames having sealed sections defining a fluid reservoir for containing hydraulic fluid pumped to a hydraulic circuit for the hydraulic motors and controls. The machine tools and set-up stations each include cams which mechanically unlatch the rails for extension, and hydraulic cylinders for lifting the pallets off the rails when extended into the rail guides.

23 Claims, 19 Drawing Figures

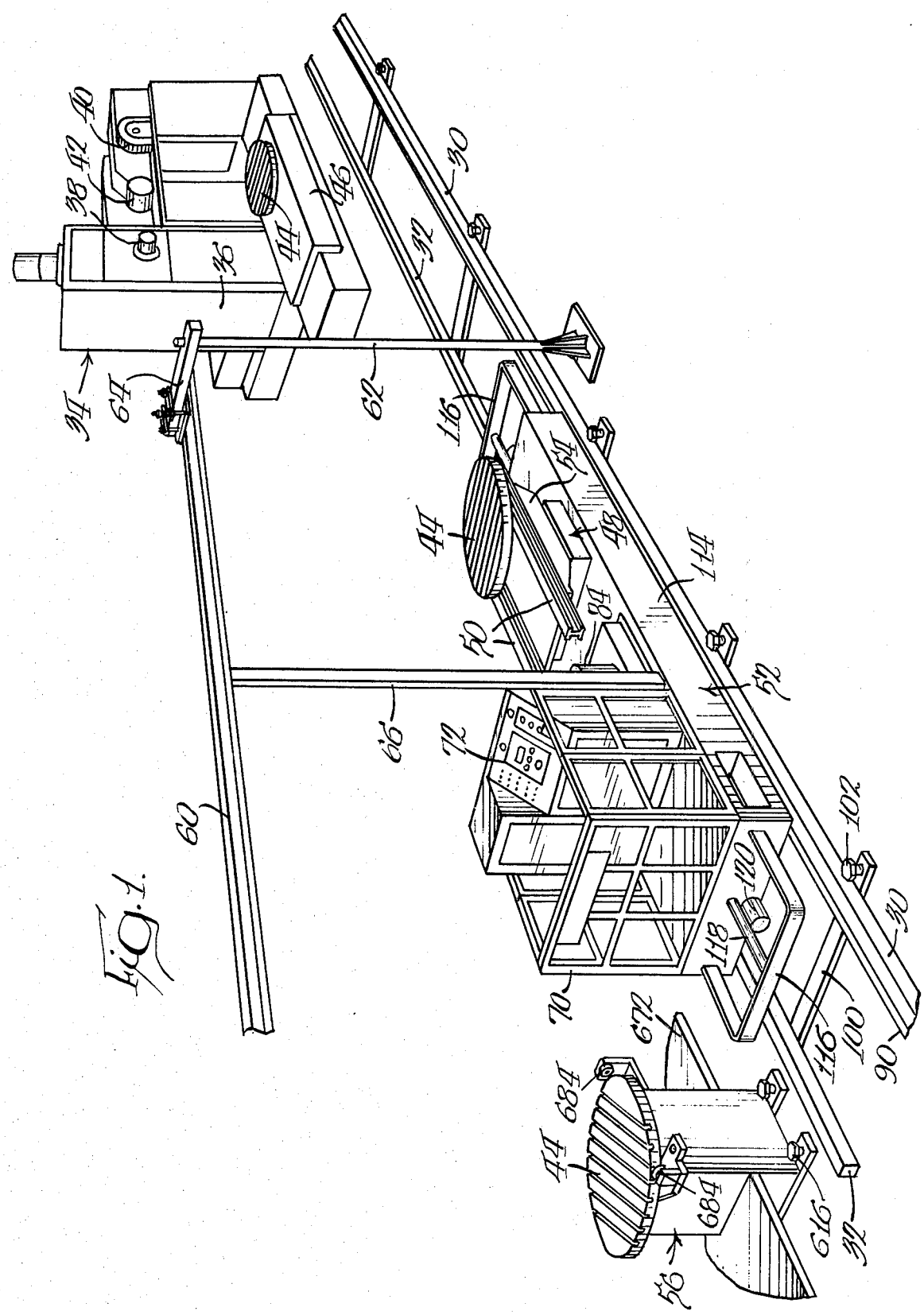

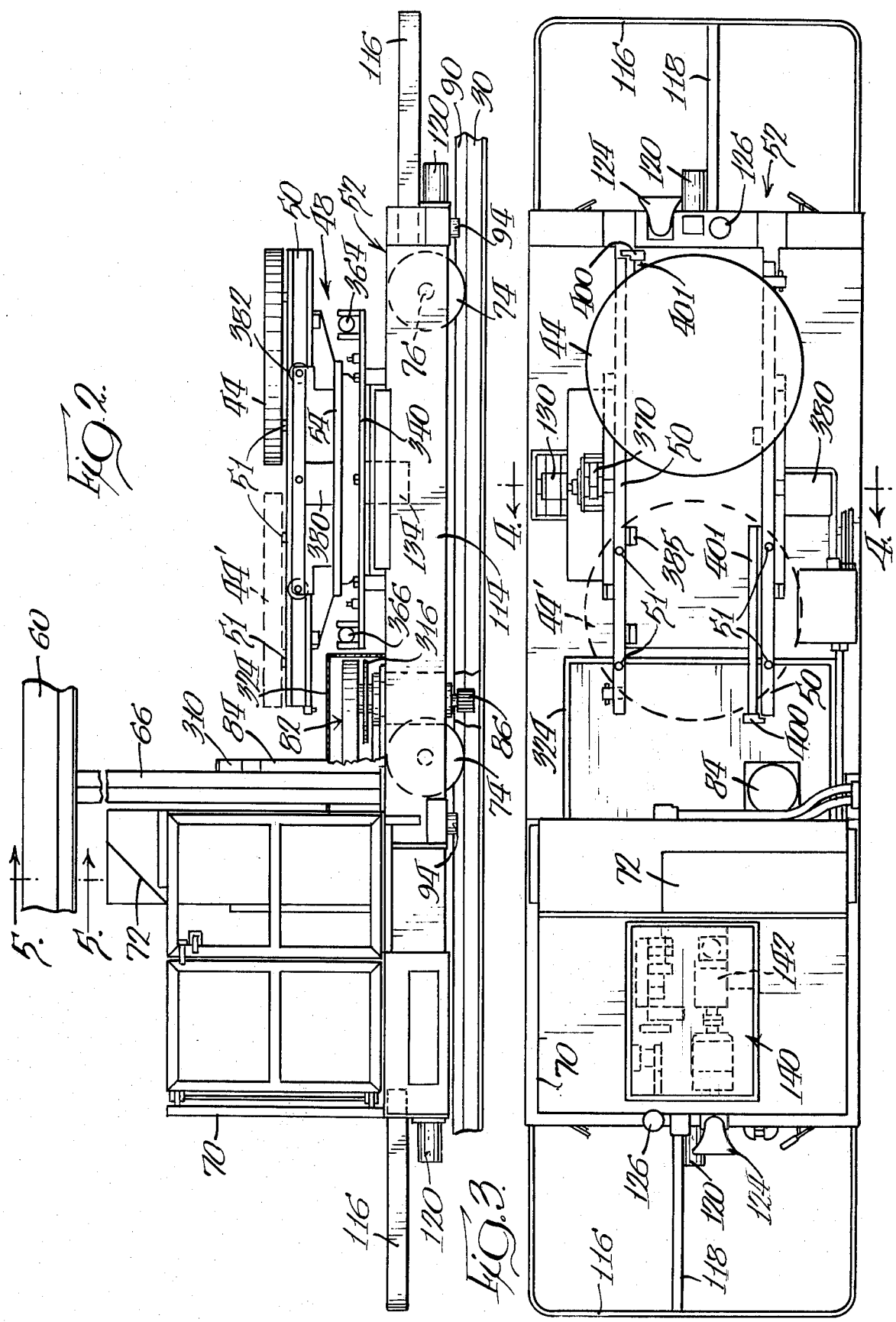

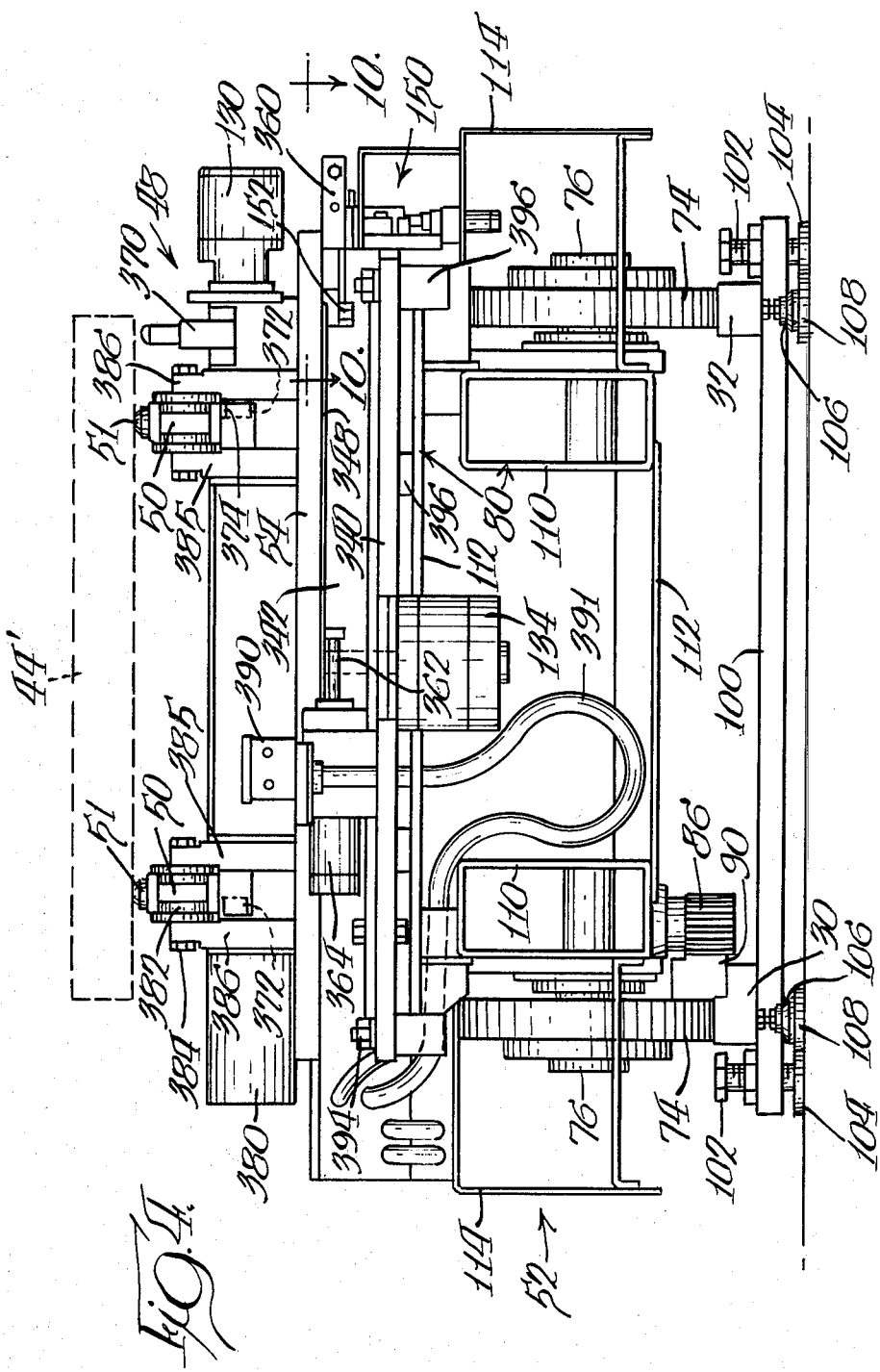

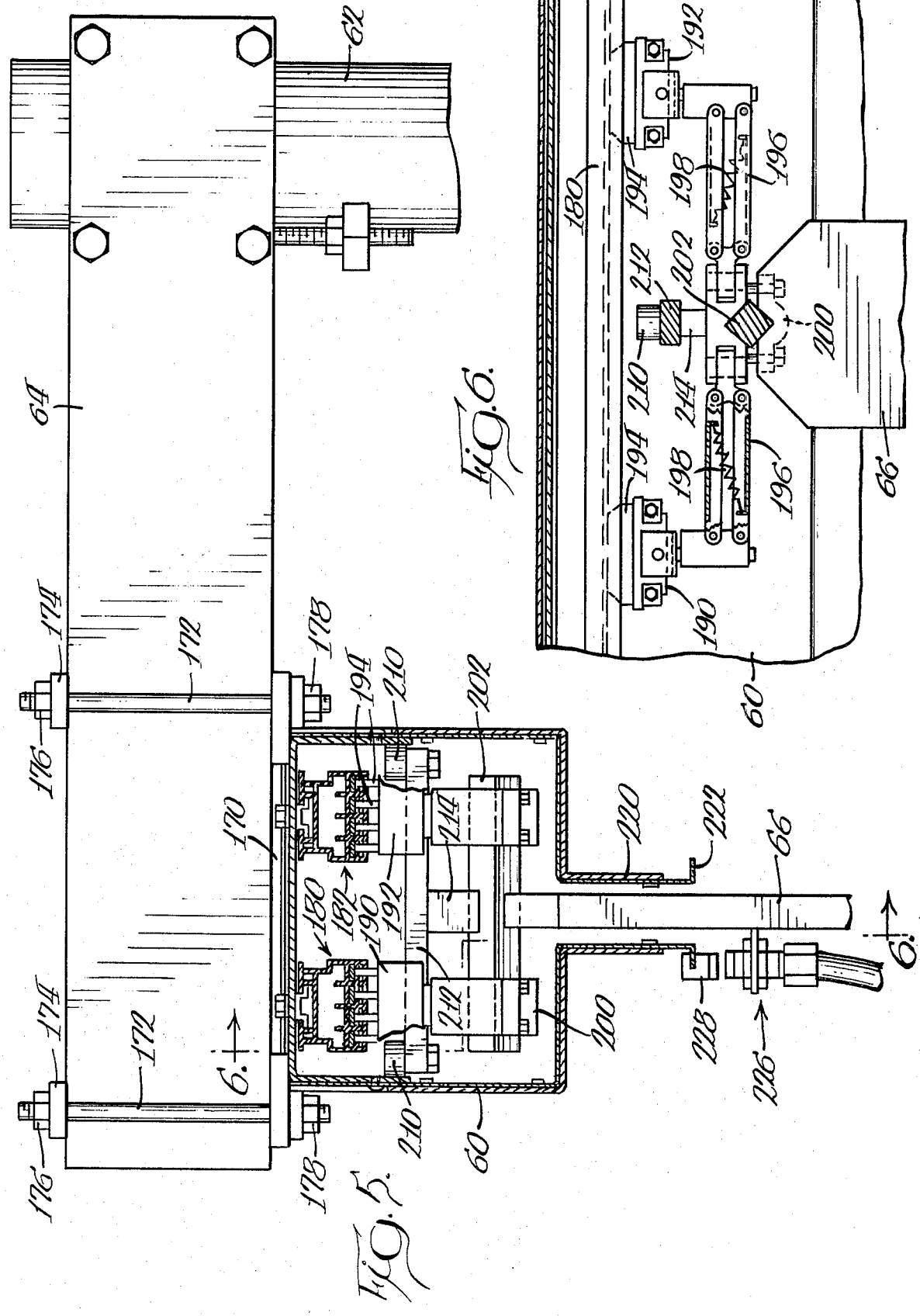

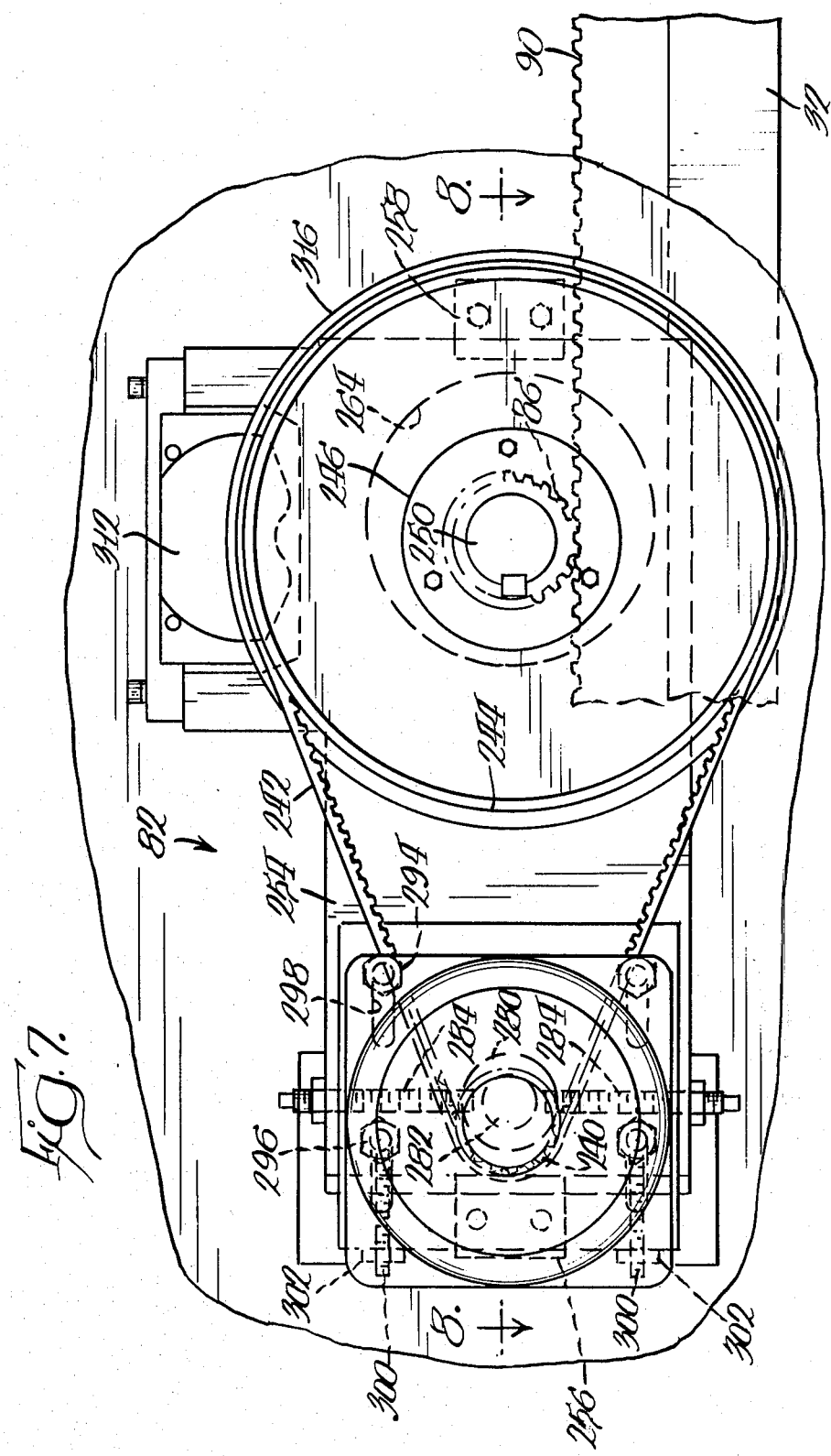

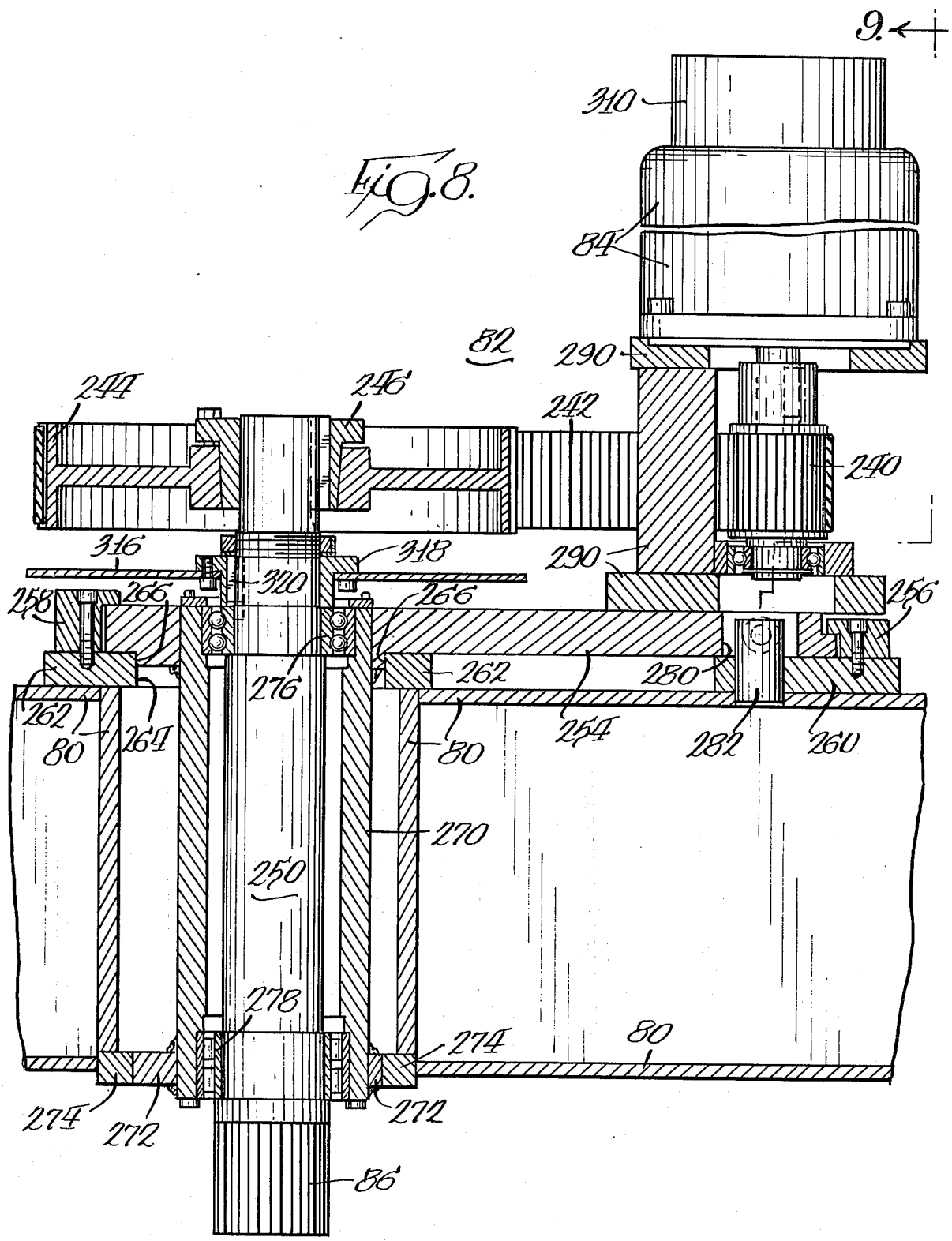

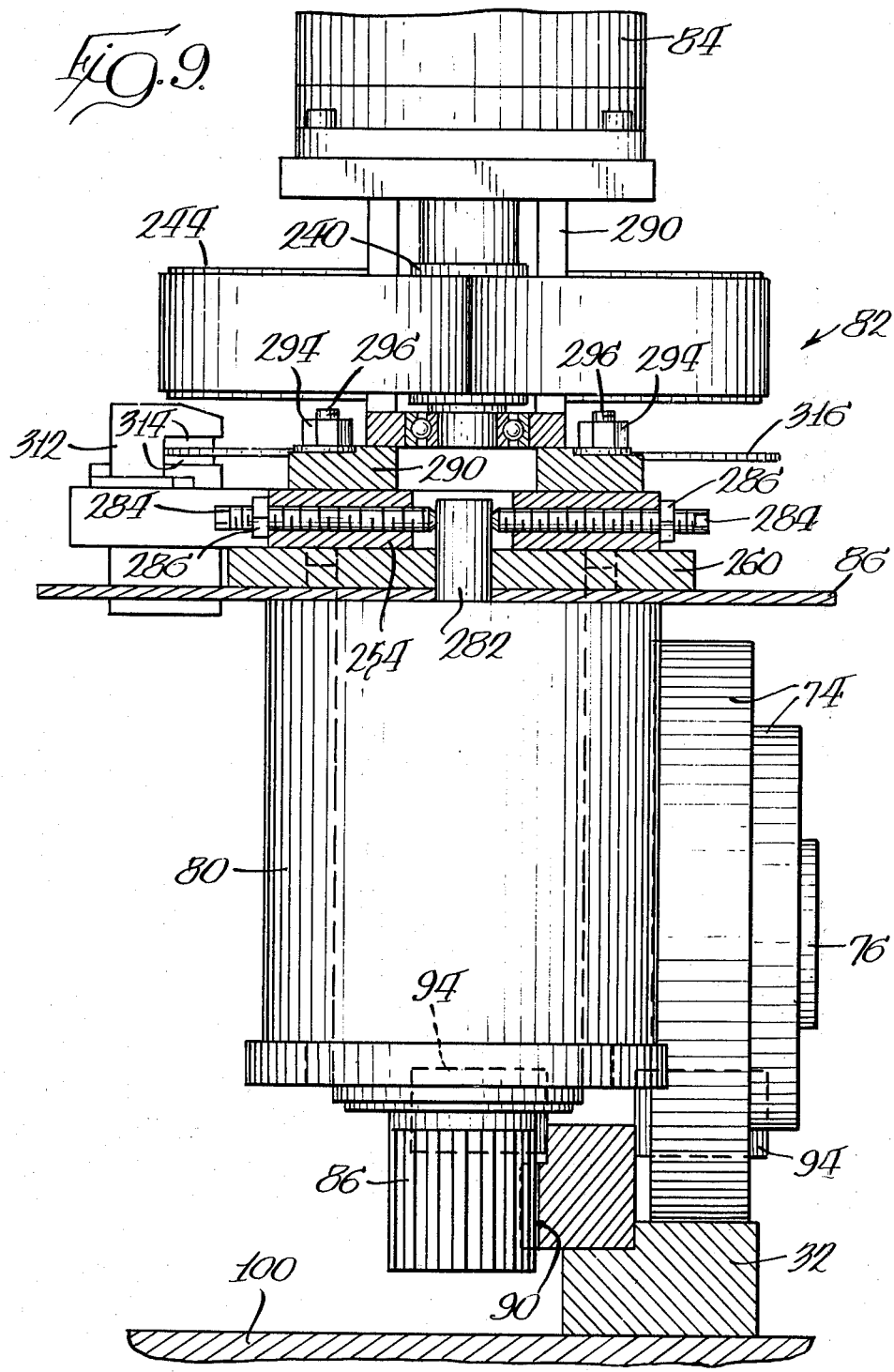

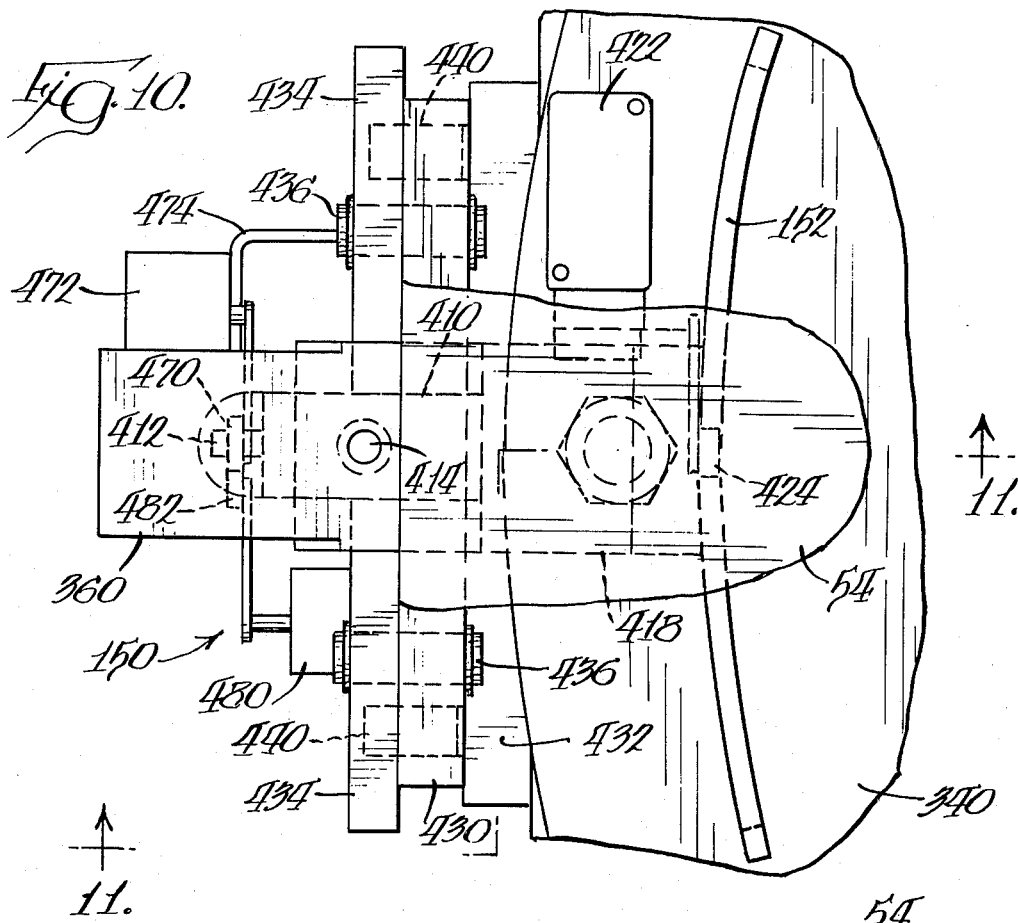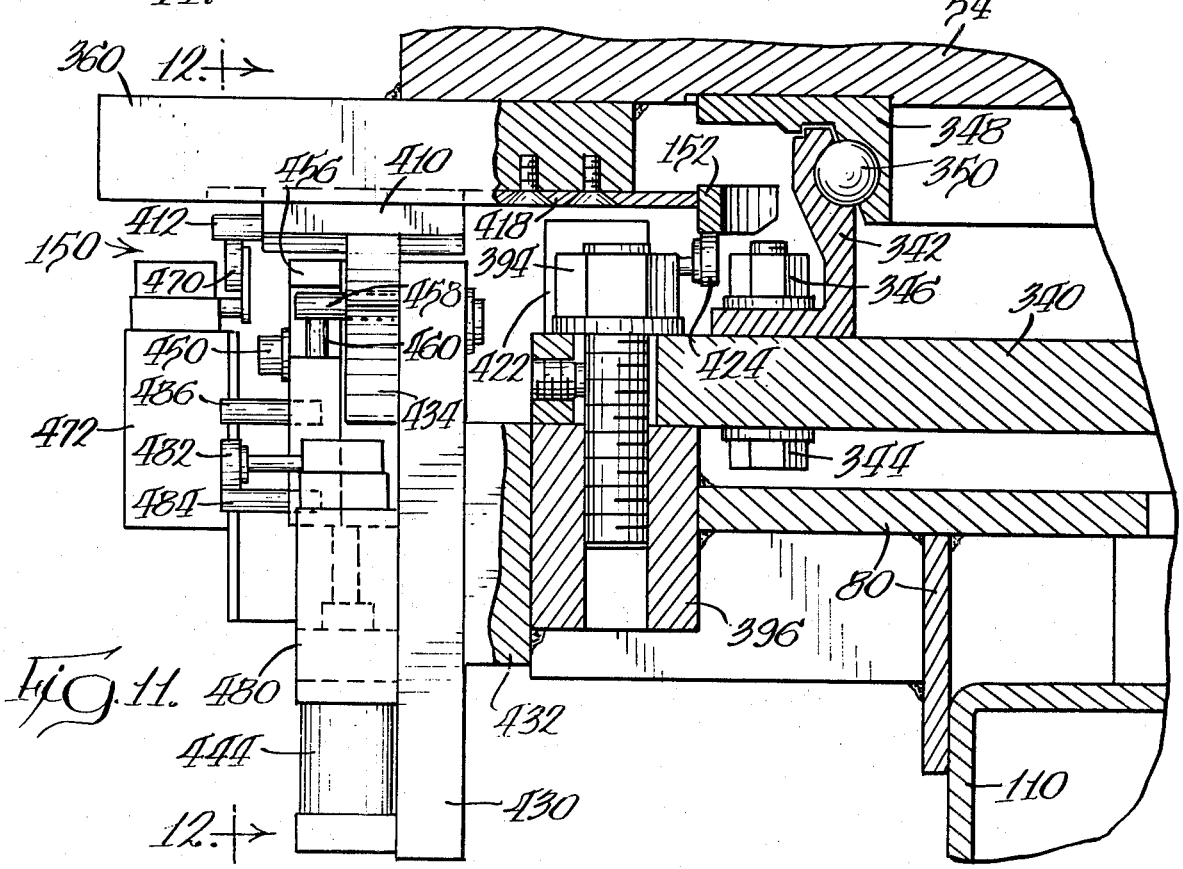

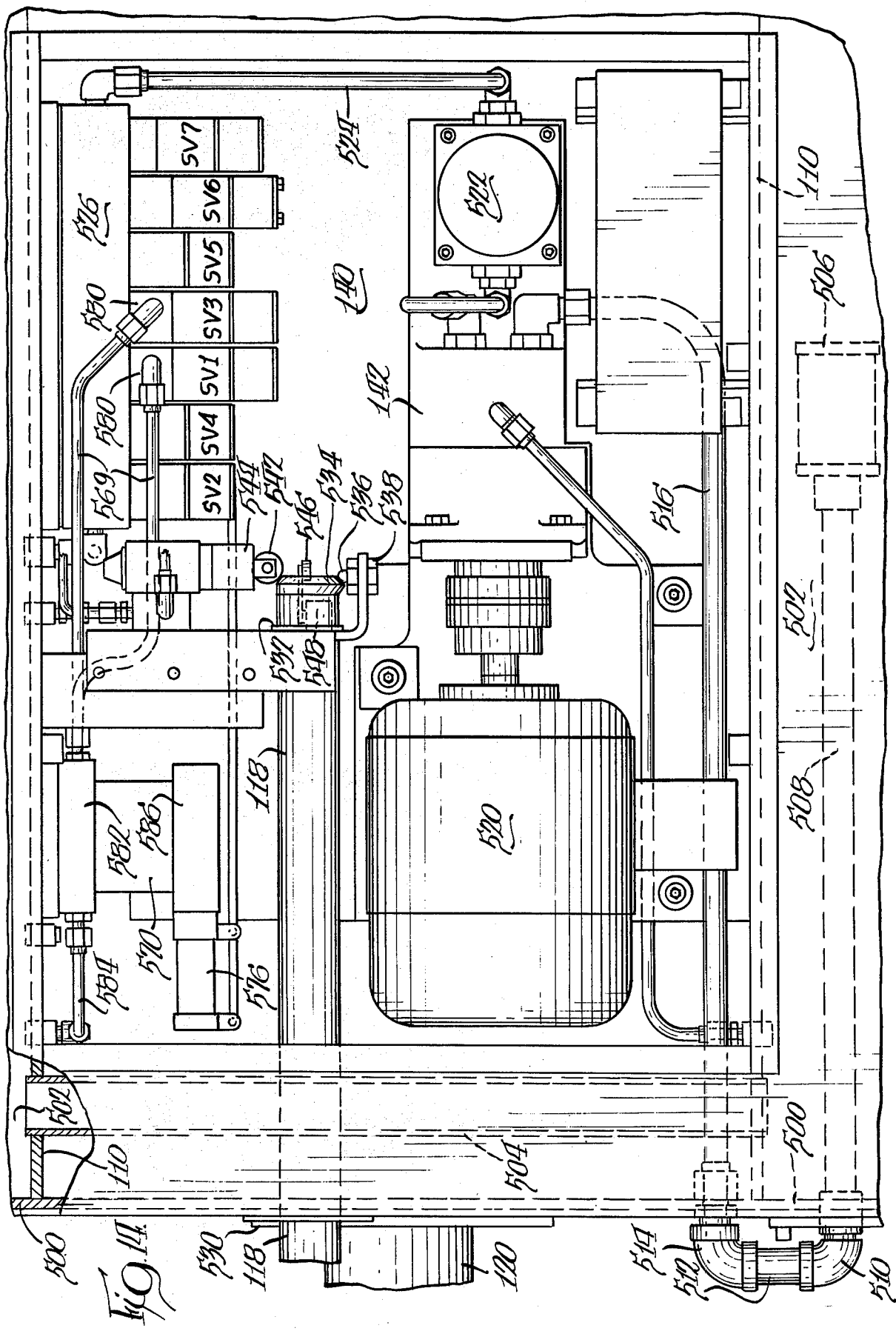

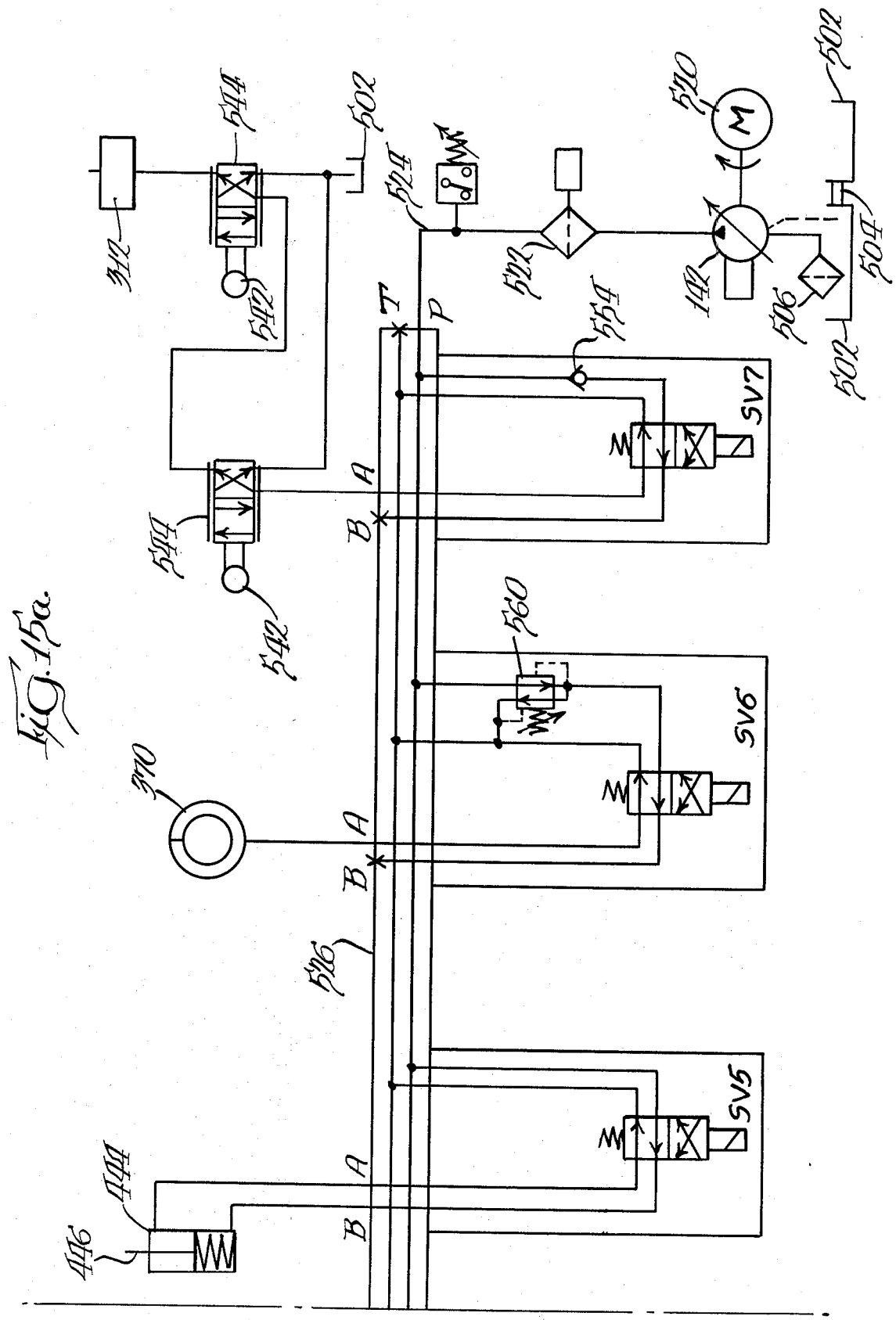

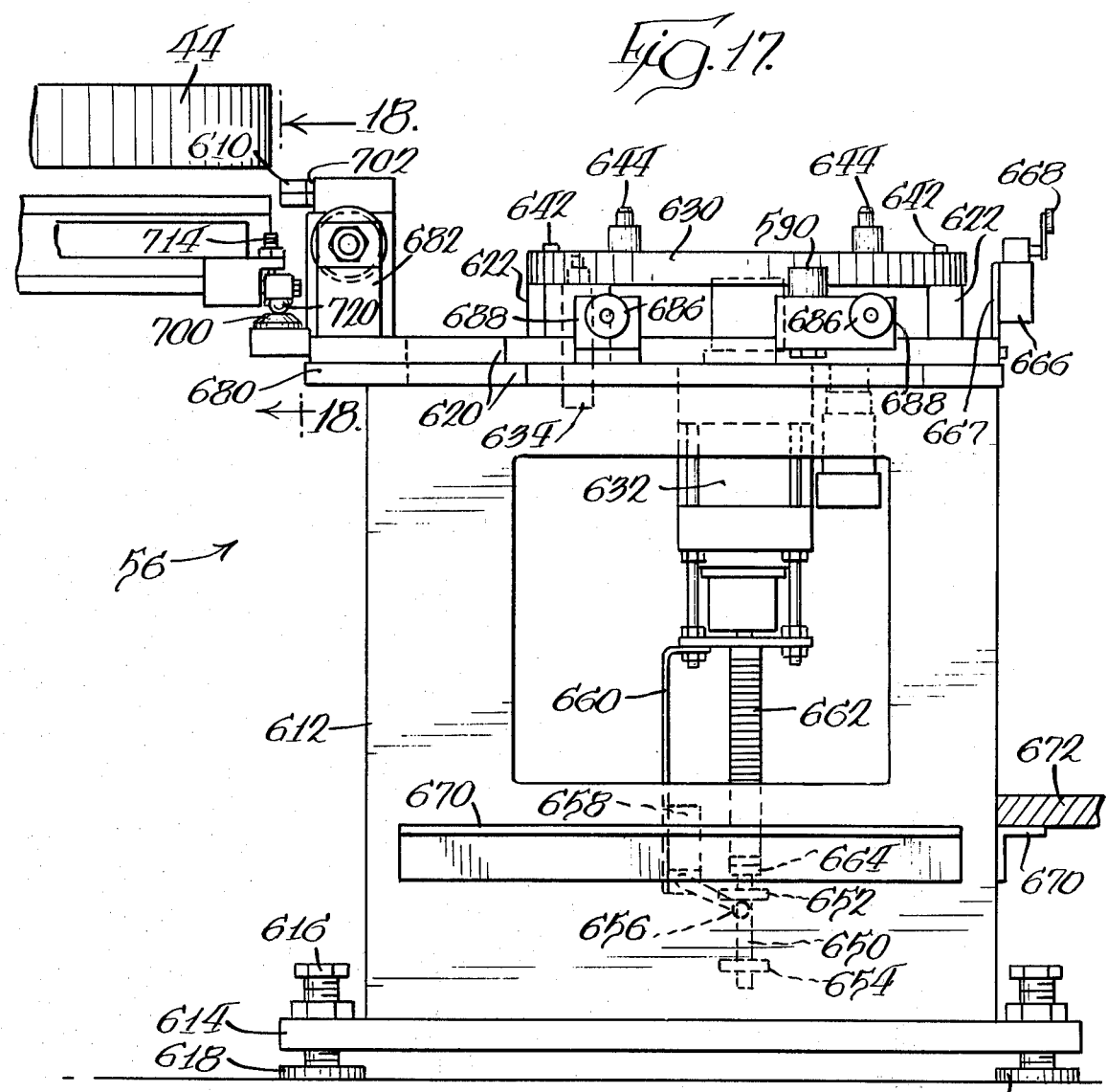
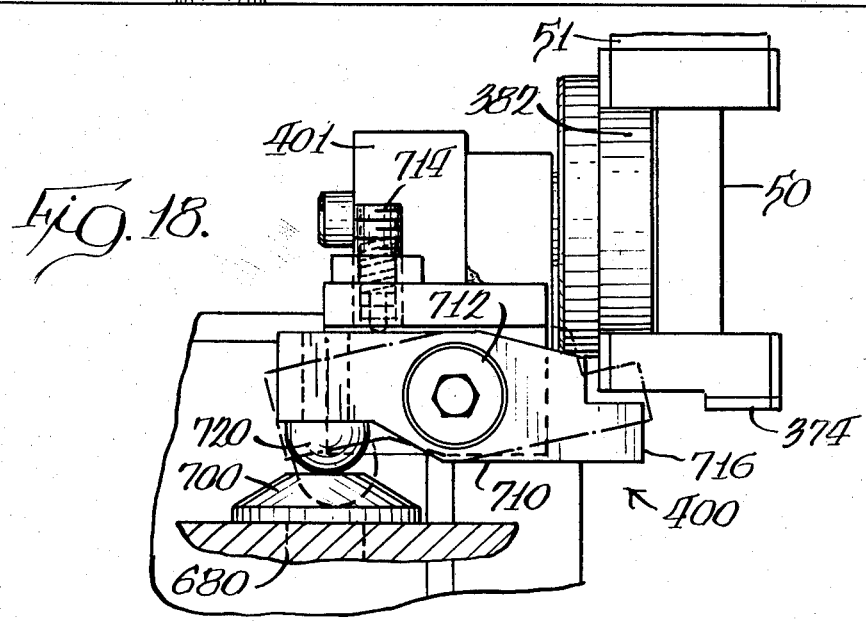

PALLET SHUTTLE SYSTEM

BACKGROUND OF THE INVENTION

This invention relates to a pallet carrying vehicle system for interchanging pallets, to which workpieces are fixtured, between different machine tools and other pallet handling stations.

Pallet shuttle systems for interchanging workpiece carrying pallets between different machine tools and set-up stations in a manufacturing facility have incorporated various vehicles movable along trackways. Generally, a pair of tracks, which may be elevated or floor mounted, extend adjacent the series of machine tools and set-up stations. A vehicle car is driven by an electric motor which rotates wheels which frictionally move the car along the tracks to a particular station. A pair of rails, transverse with respect to the tracks, are slidably mounted on the car for extension outwardly to shuttle a pallet carried thereon to an adjacent station.

The pallet shuttle rails on such vehicles have carried a single pallet because it is advantageous to minimize the width of the vehicle in order to space the machine tools closer to the shuttle track. As a result, the vehicle must first travel to a machine tool and remove the pallet located thereon, transport the pallet to a different position, and then make a return trip with a new pallet which is to be received by the machine tool. To prevent machine tools from being idle while pallets are being shuttled, each machine tool is equipped with intermediate pallet storage or loading equipment so that a new pallet is immediately available to the machine tool upon removal of the old pallet.

To eliminate the necessity for intermediate pallet storage equipment at each machine tool, it has been known to mount a pair of side-by-side rail assemblies on a vehicle car. One traverse rail assembly is empty while the remaining rail assembly carries a new pallet. The vehicle car first aligns the empty rail assembly with the machine tool pallet changing mechanism, extends the rails, and withdraws the old pallet. The vehicle car is then driven to align the other pallet carrying rails with the machine tool pallet changer mechanism, and the new pallet is transferred to the machine tool. Unfortunately, this system requires vehicle movement during a pallet interchange, and requires that the machine tool be idle while the vehicle car moves the pair of rail assemblies in alignment with the pallet changer mechanism of the machine tool.

The pallet carrying rails of a vehicle car must be precisely positioned with respect to the pallet changer of the machine tool in order to effect interchange of a pallet. Often this positioning must be accurate within a few thousands of an inch. Such accuracy cannot be obtained by an electric motor which drives wheels frictionally resting on a track, due to slippage between the wheels and the track. A supplemental aligning system, such as a latching mechanism which captures or detents the vehicle at a precise position, has been required to finally align the pallet carrying rails with the pallet changer mechanism of the machine tool. The necessity for a separate vehicle latching mechanism at each machine tool unduly increases the complexity and costs of the shuttle system. Also, it is difficult to readily add new stations to an existing shuttle system.

Floor mounted pallet changers have been used with individual machine tools for removing an old pallet on a machine tool and depositing a new pallet. The pallet changers includes a pair of pallet carrying rails which extend and retract to retrieve a pallet, after which a platform rotates the rails by 180°, and then the rails extend to deposit a new pallet carried at the opposite end of the rails. Such pallet changers have been considered too long for advantageous use in a vehicle shuttle system. Furthermore, such pallet changers typically use hydraulic motors for rotational indexing and rail extension, and their hydraulically controlled mechanisms are not readily adaptable to be driven by electric motors of the type heretofore used on vehicle cars. As a result, such pallet changes have been limited to floor mounted units utilized with individual machine tools.

SUMMARY OF THE INVENTION

In accordance with the present invention, an improved pallet shuttle system for interchanging pallets between a plurality of machine tools and set-up stations overcomes many of the disadvantages of prior pallet shuttle systems. A wheeled vehicle car is movable along a pair of tracks by an electric motor which drives a pinion meshed in engagement with a toothed rack mounted to one of the tracks. A rail assembly, capable of carrying a pair of pallets at each end thereof, is mounted to a platform rotatable by a hydraulic motor to 90° indexed positions. During vehicle travel, the pair of rails are latched parallel to the tracks to minimize the width of the vehicle car. Upon reaching a station, the platform is rotated 90° and a hydraulic motor extends the empty rails outward to retrieve a pallet then at the station. The platform is then rotated by 180° and the rails are again extended to deposit a new pallet at the station. Interchange of pallets occurs without motion of the vehicle along the tracks.

The vehicle chassis is formed by a pair of tubular frames which are sealed to hold hydraulic fluid for a self-contained, on-board hydraulic system which drives the hydraulic motors for the platform and rail assembly. To provide electrical power to the electrical motors on the vehicle and to provide electric control signals, a vertical standard extends upward from the vehicle to an overhead trolley protected from adverse conditions such as metal chips and oil mist.

One object of the present invention is the provision of a shuttle vehicle movable along a trackway to spaced pallet changing mechanisms at machine tools, the vehicle having pallet carrying rails which can be extended and rotatably indexed for a pallet interchanging operation. During vehicle travel, the rails are latched at a travel position parallel with the trackway.

Another object of the present invention is the provision of a machining system including a vehicle having extendable rails for interchanging pallets to which workpieces are fixtured, with the vehicle being positively driven along a trackway by a pinion meshed in engagement with a rack extending along the trackway. The extendable rails can be precisely positioned for extension into the pallet changer mechanisms of set-up stations and machine tools without a supplemental latching or detent mechanism for mechanically locking the vehicle to the track or to the adjacent set-up station or machine tool.

Still a further object of the present invention is the provision of an improved pallet carrying vehicle which has modular features adaptable to a wide variety of different production requirements, which can readily be extended or shortened to fit varying combinations of machine tools and set-up stations, and economically use existing components and assemblies to minimize the costs of the shuttle system.

Other objects and features of the invention will be apparent from the following description and from the drawings. While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated.

BRIEF DESCRIPTION OF THE DRAWINGS

FIG. 1 is a perspective view of the overall shuttle car system for interchanging pallets between machine tools and set-up stations;

FIG. 2 is a side view of the shuttle car;

FIG. 3 is a top view of the shuttle car;

FIG. 4 is an enlarged center cross-section of the shuttle car, taken generally along lines 4—4 of FIG. 3;

FIG. 5 is an enlarged rear view, partly in cross-section, of the overhead trolley system, taken generally along lines 5—5 of FIG. 2;

FIG. 6 is a side cross-sectional view of the collector shoe assembly of the trolley system, taken generally along lines 6—6 of FIG. 5;

FIG. 7 is an enlarged top view, partly in section, of the car drive assembly;

FIG. 8 is a side cross-sectional view of the car drive assembly, taken generally along lines 8—8 of FIG. 7;

FIG. 9 is a front view, partly in cross-section, of the car drive assembly and associated rack and track, taken generally along lines 9—9 of FIG. 8;

FIG. 10 is an enlarged top plan view, partly in section, of the intermediate latch mechanism for the car pallet changer, taken generally along lines 10—10 of FIG. 4;

FIG. 11 is a rear cross-sectional view of the intermediate latch mechanism, taken generally along lines 11—11 of FIG. 10;

FIG. 14 is an enlarged top plan view of the hydraulic compartment seen in dashed lines in FIG. 3;

FIGS. 15a–15b together show a single hydraulic circuit for the shuttle car;

FIG. 17 is a rear view of the set-up station, taken generally along lines 17—17 of FIG. 16; and FIG. 18 is an enlarged side view, partly in section, of the rail stop, taken generally along lines 18—18 of FIG. 17.

SHUTTLE CAR SYSTEM

Figure 12:
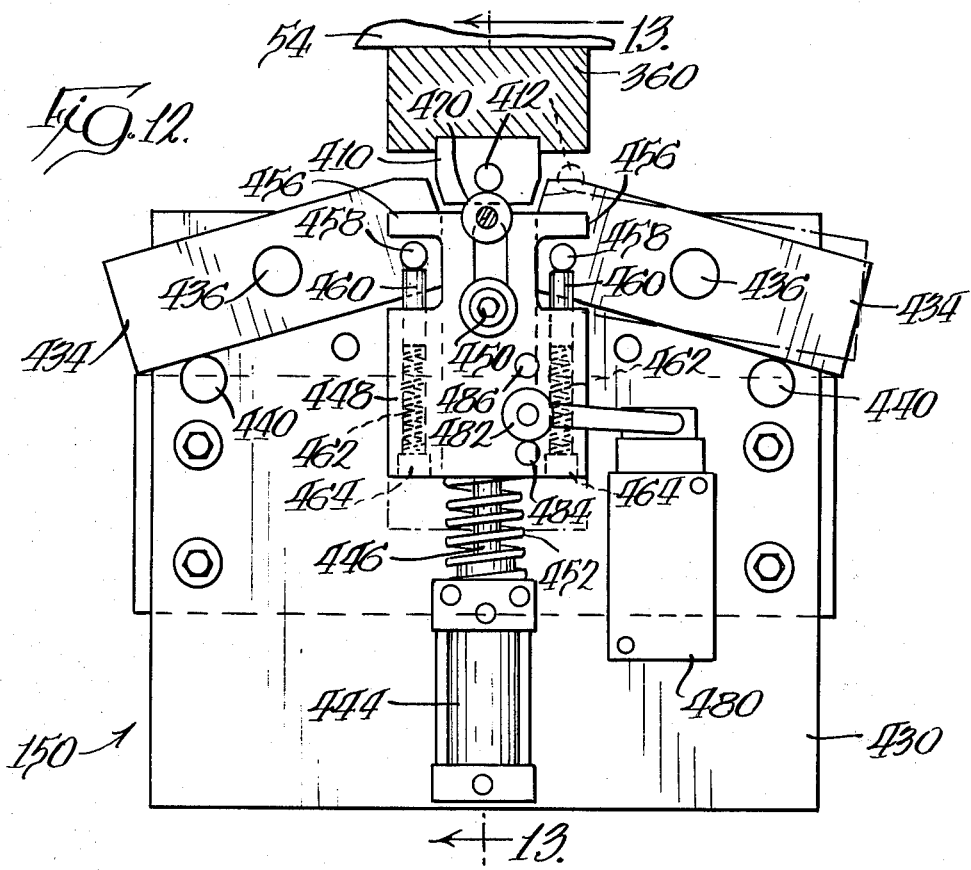
FIG. 12 is a side view, partly in section, of the intermediate latch mechanism, taken generally along lines 12—12 of FIG. 11.
Figure 13:
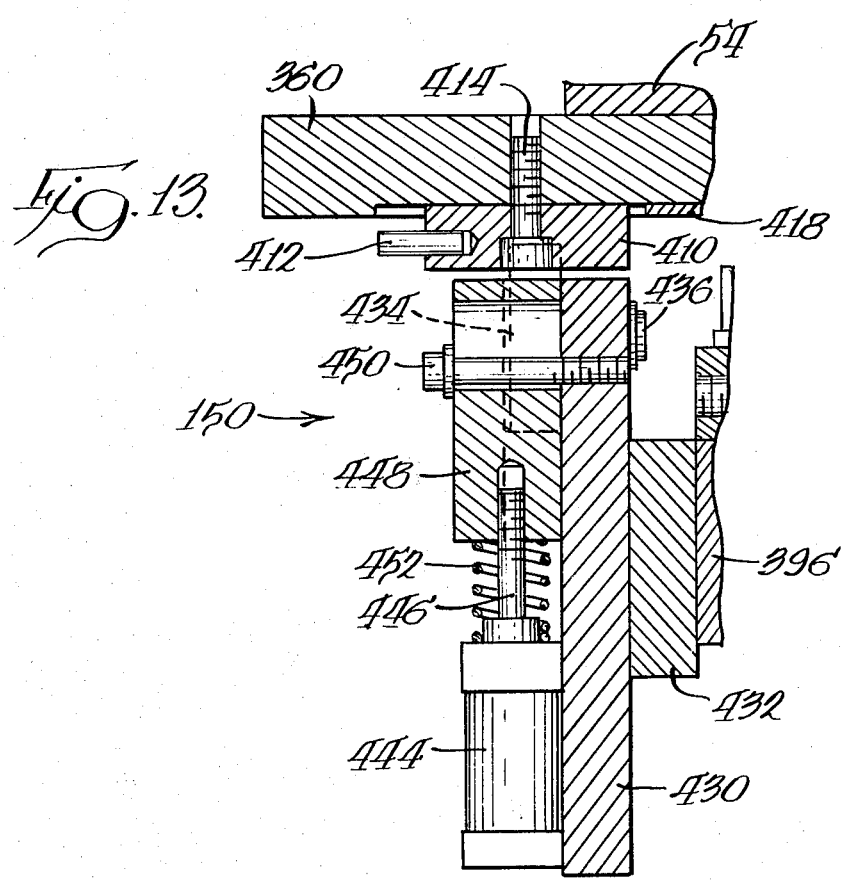
FIG. 13 is a rear cross-sectional view of the intermediate latch mechanism, taken generally along lines 13—13 of FIG. 12.

Turning to FIG. 1, the shuttle car system includes a trackway in the form of a pair of tracks 30 and 32 which extend adjacent a plurality of machine tools 34, only one of which is illustrated. The machine tools 34 may include a column 36 upon which a spindle head 38 for rotating a chip cutting tool is movably mounted in vertical ways. A tool storage chain 40 contains individual tools which can be interchanged by a tool changer 42 with the tool contained in the spindle head 38. Workpieces (not illustrated) are fixtured to precision pallets 44 which are removably mounted on a traversing work table 46.

After a machining operation is completed at machine tool 34, the pallet 44 and fixtured workpiece must be interchanged with a new pallet 44 containing a workpiece, such as the pallet carried by a car mounted pallet changer mechanism 48 having transfer rails 50 for supporting two pallets 44 thereon. Mounted at both ends of the pair of transfer rails 50 are four pads or supports 51, see FIGS. 2 and 3, for supporting pallets 44 thereon. For clarity, only one pallet 44 is shown on the pair of supports 51 of the transfer rails 50, as would be typical during travel of the vehicle. The other pallet position is represented in some of the figures by the dashed lines 44'. The pallet changer 48 is mounted on a vehicle car 52 which moves in forward and reverse directions along the pair of tracks 30, 32. The pallet carrying rails 50 are slidably mounted on a rotatable platform 54 which can be indexed by 90° increments when the vehicle car 52 is positioned adjacent any pallet handling station such as the machine tool 34.

A typical sequence of events is as follows, assuming the production system has already been supplied with pallets carrying fixtured parts thereon. Before the illustrated machine tool 34 has finished machining the present workpiece located on its worktable, shuttle car 52 travels adjacent the machine tool, carrying on rail assembly 50 the next pallet to be interchanged. Upon completion of machining, the rails 50 index 90° to present the empty supports 51 to the machine tool, and then extend into engagement with the pallet changer mechanism at the machine tool, which lowers the present pallet onto the extended rails 50. The rails 50 then retract and the platform 54 rotates by 180° to position a new pallet 44 adjacent the pallet changer mechanism of the machine tool. The rails 50 are then extended, after which the machine tool pallet changer mechanism raises the pallet off the rails 50. The rails 50 are then retracted, and the platform 54 is rotated 90° so that the vehicle car 52 can travel to the next station which is to receive the pallet then on its rails 50.

Pallet 44 may enter and leave the system at a plurality of set-up stations 56, only one of which is illustrated in FIG. 1. Each set-up station 56 includes a pallet changer mechanism for raising pallets above and lowering pallets on the rails 50 so as to interchange the pallets between the stations 56 and the vehicle car 52. When workpieces are to enter the system, an empty pallet 44 is positioned on station 56 and the workpiece is manually fixtured by an operator to the empty pallet. At the proper time, a vehicle car 52 is driven opposite the set-up station 56 which has raised the pallet, and the platform 54 is indexed 90°. The rails 50 are extended and the station 56 lowers the pallet onto the rails. The rails 50 are then retracted and the platform 54 is indexed by 90° to its travel position parallel with the tracks 30, 32. Pallets which are to leave the system may exit by being deposited at the set-up station 56.

Since the car rail assembly 50 has only rotation and extension capabilities, without the capability of vertical reciprocation, the car pallet changer mechanism is substantially simplified. Although the pallet changing mechanisms at each machine tool 34 and set-up station 56 must be able to elevate and lower pallets onto the rail assembly 50, this capability may be already present to allow pallet interchange with floor mounted pallet changers. The pallet changer for the machine tool 34 may take the form shown in a patent application of Robert E. Blomquist, entitled "Indexing Pallet Carrier for Machine Tools", Ser. No. 595,338, filed July 14, 1975, now U.S. Pat. No. 3,986,617 issued Oct. 19, 1976, assigned to the same assignee as the present application, the contents of which are hereby being incorporated by reference herein. Alternatively, the vehicle pallet changer mechanism 48 could be vertically movable by adding a hydraulic cylinder similar to that used in set-up station 56, in which event the need for vertical reciprocating motion at the pallet handling stations could be eliminated.

Electrical power and remote control signals are transmitted to the car 52 by an overhead duct 60 which is suspended above the trackway by a plurality of trolley posts 62 secured to the floor, only one of which is illustrated in FIG. 1. Each post 62 has a crossarm 64 for suspending the overhead duct 60 vertically above the side edge of the car 52. A hollow vertical standard 66 extends upward from the car 52 and through a narrow slot in the overhead duct 60 to a trolley collector assembly. The electric control signals may remotely control all movements of the shuttle car 52. Alternatively, an operator may stand within a cabin or cage 70 on the vehicle, and manually operate switches provided on a control panel 72 to move the car 52 along the tracks 30, 32 and to operate the car pallet changer 48.

As seen in FIGS. 2 and 4, the car 52 is supported on the tracks 30, 32 by four wheels 74 which are fastened to freely rotatable axles 76 journalled in the car chassis 80. Positive drive along the tracks 30, 32 is provided by a car drive assembly 82 which includes a DC electric motor 84 for rotating a pinion 86 meshed in engagement with a toothed rack 90 secured to the track 30. Two pairs of freely rotatable rollers 94, FIGS. 2 and 9, extend downwardly from the car and press against both sides of the rack 90 to prevent skew as the off-center pinion 86 drives the car forwardly and rearwardly along the tracks 30 and 32.

As seen in FIG. 4, the trackway consists of the tracks 30 and 32 which are secured to crossties 100 each having leveling screws 102 which adjust the height of the crosstie above a pad 104 secured to the floor. Between crossties, a plurality of support jacks 106 extend from the tracks 30 and 32 to pads 108 mounted on the floor. The screws 102 and support jacks 106 allow vertical height adjustment so that the entire trackway can be horizontally aligned over a somewhat uneven floor. If desired, a grill can be placed between the crossties 100 and the tracks 30, 32 to cover a trench between the tracks which may contain a chip disposing conveyor or the like.

Car chassis 80, as seen in FIG. 4, includes a pair of tubular frames 110 of rectangular cross-section, which extend the entire length of the vehicle. A plurality of crossplates 112 are welded to the tubular frames 110 and to associated support members to form a box-like frame. A pair of side covers 114 extend outward from the tubular frames 110 to generally enclose the chassis and the components located thereon. A pair of front and rear bumpers 116 are mounted for telescopic collapsing into the ends of the car should the bumpers 116 engage any obstruction along the trackway. Bumper tubes 118 extend from about the center of the bumpers 116 into the chassis and engage detents, as will appear, for maintaining the bumpers extended until a predetermined amount of force has been exerted against them. As a bumper and its post 118 collapse into the end of the car, a control system automatically releases a spring loaded caliper brake on the car drive assembly 82, and disconnects power to the DC motor 84 so that the vehicle will come to a halt before the bumper 116 has collapsed inwardly beyond the extent of a resilient energy absorbing bumper 120. After the car has come to a halt and the obstruction has been removed, the collapsed bumper 116 is manually pulled outward until its bumper post 118 seats within the detent mechanism, thus releasing the spring loaded brake and allowing the DC motor 84 to continue to drive the car. Various safety warning systems can be provided on the vehicle to warn of the approaching presence of the vehicle, such as audible horns 124, flashing lights 126, and other devices, shown for clarity only in FIG. 3.

Car pallet changer 48 includes a motive means in the form of a hydraulic rail motor 130 for rotating a pair of pinions which engage toothed racks on the bottoms of the pair of rails 50 to extend the transfer rails to either side of the car when the platform 54 has been rotated 90° by motive means in the form of a hydraulic index motor 134. The vehicle car includes an entirely self-contained hydraulic system for operating the hydraulic rail motor 130, the hydraulic index motor 134, and other hydraulic devices. Under an access cover in the floor of the operator cabin, a hydraulic compartment 140 is located between the tubular frames 110, the frames 110 being sealed by crosswalls to form a tank for holding hydraulic fluid. The hydraulic fluid is pumped by a hydraulic pump 142 to a hydraulic control circuit for the pallet changer 48.

During travel along the tracks 30, 32 the rail carrying platform is latched in an intermediate angular travel position, as shown in FIGS. 1–4, by an intermediate latch mechanism 150, FIG. 4. The intermediate latch mechanism 150 includes deceleration cam 152, FIGS. 10 and 11, for decelerating the rotatable platform 54 as it approaches the intermediate position. Various limit switches are associated with the intermediate latch assembly 150 to control the intermediate latch operation.

OVERHEAD TROLLEY SYSTEM

Turning to FIGS. 5 and 6, the details of the overhead trolley system of FIG. 1 are shown in detail. Overhead duct 60 is bolted to a square plate 170 having four holes through which studs 172 extend for securing the duct to the crossarm 64. A pair of clamp members 174 extend across the width of the crossarm 64 and are secured to studs 172, on opposite sides of the arms 64, by nuts 176. Nuts 178 are threaded on the studs 172 to secure the plate 170 to the arm 64. The crossarms 64 and the trolley post 62 are hollow and contain the electric power wires and electric control wires which extend from a remote location to a power bus 180 and a control bus 182 within the duct 60. Each bus 180 and 182 contains four elongated copper bars housed within an insulating plastic extrusion. A power collector shoe 190 and a control collector shoe 192 each contain four collector plates 194 which slidably engage the four copper bars within the buses.

Each collector shoe 190 and 192 is connected through a link assembly 196, upwardly urged by a spring 198, to a clamp 200 which grips a crossbar 202 welded to the top of the vertical standard 66. The vertical standard 66 is formed of two tubes of rectangular cross-section, which contains power lines and control lines running from the collector plates 194 to the car.

To prevent lateral sway in the collector assembly as it is driven by the vertical standard 66 through the interior of the duct 60, a pair of outboard rollers 210 are mounted on the ends of a crossarm 212 which is secured by a center post 214 to the crossbar 202.

Overhead duct 60, which is generally of square cross-section, has a reduced diameter, downwardly extending neck 220 of a width slightly larger than the width of the vertical standard 66. The neck 220 terminates in a pair of outwardly extending flanges 222 which define therebetween a narrow, elongated slot through which the standard 66 travels as the car moves along the trackway. The narrow neck protects the power bus 180 and control bus 182 from flying metal chips and oil mist which surround the vicinity of each machine tool. The illustrated configuration thus eliminates many of the contamination problems which would occur if an underground trolley system were utilized to pass electrical power and control signals to the vehicle car. Also, the duct system is adapted to be assembled as standard modular pieces of fixed length, which can be readily added at any time to the shuttle system.

The vertical standard 66 may carry a proximity switch 226 for sensing a switch actuator 228 secured to the flange 222 of the neck 220 at the location of a station. While the switch actuator 228 is not used as the primary means of locating the car at a station, it may be utilized as a redundant safety check to insure that a car is positioned at a station before the pallet changer mechanism 48 is activated.

CAR DRIVE ASSEMBLY

Turning to FIGS. 7-9, the car drive assembly 82 is shown in detail. The car drive motor 84, which is an electric DC motor, rotates a toothed drive pulley 240 which, through a toothed belt 242, drives a toothed driven pulley 244. The pulley 244 is keyed to a bushing 246 for rotation of a pinion shaft 250 having at its terminating end the toothed pinion 86 which meshes with the toothed rack 90.

The entire car drive assembly 82 is mounted on an eccentric or angularly adjustable frame 254 which can be secured by a pair of clamps 256, and 258, to a rear pad 260 and a front annular pad 262 welded to the chassis 80. Frame 254 has a pilot projection 266 journalled within front circular opening 264 in pad 262 for rotation of the frame 254 about the center axis of the circular opening 264. Within the projection 266 is an eccentric circular opening which fixedly mounts a cylindrical drive housing 270 which rotatably supports coaxial pinion shaft 250. An eccentric ring 272 welded to the bottom of the drive housing 270 is journalled within an annular ring 274 which is welded to the chassis 80. The pinion shaft 250 is rotatably mounted in housing 270 by an upper ball bearing assembly 276 and a lower ball bearing assembly 278. Thus, the axis of rotation for pinion 86 is offset from the axis of rotation of the frame 254.

The angularly adjustable frame 254 also contains a rear circular opening 280 into which extends the end of a pin 282 fixedly secured to pad 260 and chassis 80. A pair of adjustment screws 284 extend through threaded bores in the frame 254 into engagement with the pin 282. The screws 284 can be rotated so as to rotate the frame 254 about the center line of the opening 264, thereby rotating the toothed pinion 86 into close meshing engagement with the toothed rack 90 to take out backlash in the drive. After the frame 254 has been so angularly adjusted, a pair of jam nuts 286 are tightened to prevent inadvertent rotation of the adjustment screws 284. Also, the clamps 256 and 258 are tightened to further secure the frame 254 to the chassis. If automatic anti-backlash adjustment was desired, a spring or pneumatic cylinder could be located between the chassis and the frame 254 to continuously urge the frame so that the pinion closely meshed with the rack 90.

DC motor 84 is supported on a cantilevered frame 290 secured to the angularly adjustable frame 254 by four lock nuts 294 threaded on bolts 296 extending upward from the frame 254 through elongated slots 298. When the jam nuts 294 are loosened, the cantilevered frame 290 can be moved toward or away from the driven pulley 244 by rotating a pair of set screws 300 which are threaded through the cantilevered frame into engagement with two of the bolts 296. After the proper tension is set for the toothed belt 242, the jam nuts 302 are tightened to lock the cantilevered frame 290 against further movement. Also, the jam nuts 294 are tightened to clamp the frame 290 to the angularly adjustable frame 254.

Mounted above the DC motor 84 is an encoder 310 which is driven by an extension of the DC motor shaft. Encoder 310 may be configured to provide an absolute binary output representative of the position of the DC motor shaft, which in turn accurately represents the position of the car with respect to the rack 90.

When a car is to be braked in an emergency mode, as when one of the bumpers 116 telescopes into the car due to the striking of an obstruction, the power to the DC motor 84 is switched off and it is stopped by dynamic braking. In addition, hydraulic pressure is diverted from a spring loaded, hydraulically released caliper brake 312, causing a pair of brake pads 314 to engage a brake disc 316 coupled by a collar 318 and key 320 to the pinion shaft 250. The caliper brake 312 supplements the braking action provided by the DC motor in order to halt the car 52 in a shorter distance.

Drive housing 270 extends through a cylindrical bore in the tubular frame 110. A corresponding cylindrical bore is provided through the other tubular frame 110, so that the entire drive assembly 82 can be mounted on the opposite side of the car. This allows another vehicle car 52, facing the opposite direction, to be located on the tracks 30, 32 so that their pallet changers 48 will face each other. Since the pallet changers 48 are mounted nearer one end of the cars 48, this allows a pair of cars to be driven closer together to thus service machine tools which can be spaced closer together.

A cover 324, FIGS. 2 and 3, sealed to the top of the chassis protects the car drive assembly from metal chips, oil mist and the like. Transformers and other components which should be protected from the adverse machine tool environment also can be located under the cover 324.

CAR PALLET CHANGER MECHANISM

Pallet changer 48 includes a fixed frame 340, see FIGS. 4 and 11, secured to a fixed annular bearing race 342 by a bolt 344 and nut 346. A rotatable annular bearing race 348, fixedly secured to the rotatable platform 54, is mounted inwardly of the fixed race 342 to define an annular channel which contains a plurality of ball bearings 350. The hydraulic index motor 134 is fixedly secured to the frame 340, and has its shaft secured to the center of platform 54 so as to rotate the platform by 90° increments, as will appear.

Welded to the projecting side of rotatable platform 54 is a lug 360, FIG. 4, which rotates when the platform 54 is turning clockwise with respect to FIG. 3 into abutment with a plunger 362 of a shock absorber 364. When the plunger 362 is depressed, platfrom 54 decelerates to stop against a stop button and pressure is maintained on the hydraulic index motor. As the platform reaches its stop position, a limit switch is activated to cause the rails to extend. Thus, the platform 54 decelerates to a halt, with the pair of rails 50 located transversely across the car. If the platform 54 has been rotated counterclockwise, the lug 360 would have struck the plunger of a shock absorber 366, see FIG. 2, mounted on the opposite side of fixed frame 340.

Once the platform 54 is halted with the lug 360 in contact with the retracted plunger of either of the shock absorbers 364 or 366, then the pair of rails 50 can be extended outwardly toward a pallet handling station. First, a spring loaded, hydraulically released brake 370 is released to unclamp the shaft of the hydraulic rail motor 130. As motor 130 is coupled to hydraulic fluid, its shaft rotates a pair of pinions 372, FIG. 4, which mesh with a pair of racks 374 attached to the underside of the pair of rails 50. On top of the rails 50, the two sets of pads 51 engage the underside of the pallet 44 to support the same on the transfer rails.

The shaft of hydraulic rail motor 130 also extends into a switch assembly housing 380 containing a gear reduction drum cam, rotated by the shaft, for engaging a plurality of limit switches which indicate the position of the rails relative to their center position shown in FIGS. 2 and 3.

The pair of transfer rails 50 are formed by I-beams slidably supported by a plurality of flanged rollers 382 carried on cantilevered support shafts 384 which are secured in brackets 385 and 386, see FIG. 4, fastened to the rotatable platform 54. Also secured to platform 54 is an electrical junction box 390 which connects with a flexible electrical cable 391 for passing electrical signals to and from the rotatable platform. Various limit switches, such as pallet-in-position, are also located on the platform 54. In addition, a flexible hydraulic hose (not illustrated) couples hydraulic fluid between the platform 54 and the car chassis.

Pallet changer 48, to the extent described above in this section, can be a standard unit heretofore secured to a floor mounted pedestal. The pallet changer utilized herein is the one shown in a patent application of Blomquist et al, Ser. No. 595,338, filed July 14, 1975, entitled "Indexing Pallet Carrier for Machine Tools", assigned to the same assignee as the present application. In accordance with the present invention, the frame 340 (previously secured to the floor mounted pedestal) is secured by bolts 394 to a plurality of threaded pads 396 welded to the car chassis 80. Also, a number of changes are made to the pallet changer, such as the addition of the intermediate latch mechanism 150, and the addition of a pair of rail stops 400, FIG. 3, which prevent the rails 50 from extending except when adjacent a station. Each rail stop 400 is mounted at the end of an extension bar 401 and secured to bracket 386. Thus, the present invention advantageously incorporates a conventional floor mounted pallet changer, with certain modifications, thereby reducing the cost of the car mounted pallet changer and allowing use of the mating pallet changing mechanisms at the machine tools. Other types of rotatable and extendable pallet changers can be utilized, when modified in accordance with the present teachings.

Intermediate latch mechanism 150 is added to the pallet changer 48 to allow the pair of rails 50 to be latched in a 90° position, as illustrated in FIGS. 1-4, during travel of the shuttle car 52 along the tracks 30, 32. Turning to FIGS. 10-13, the intermediate latch mechanism 150 is illustrated in detail. A stop key 410, having an extending pin 412, is secured by a bolt 414, FIG. 13, to the lug 360 of the rotatable platform 54. Also attached to the lug 360 is an arcuate deceleration cam 152 which is secured by a bracket 418. As the platform 54 is rotated, the lug 410 and pin 412, and the deceleration cam 152, are rotated with respect to the remaining portion of the intermediate latch mechanism 150 which is fixed with respect to the chassis 80.

A deceleration switch 422, FIGS. 10 and 11, is secured to the frame 340 and has a roller actuator 424 located to engage the deceleration cam 152 as the rotatable platform approaches its mid-position from either direction. Actuation of deceleration switch 422, at the time the rotatable table is to be latched in its intermediate position, de-energizes a solenoid valve SV2, FIG. 15b, to decelerate the hydraulic index motor 134. The platform then creeps towards the mid-position.

For capturing the rotatable platform, a latch assembly on a mounting plate 430 is secured by a bracket 432 to the pad 396 of the car chassis. A pair of latches 434 are rotatably connected by pivot pins 436 to the fixed plate 430. The opposite ends of the latches abut a pair of stop pins 440 which are fixedly secured to the plate 430.

For retracting the pair of latches 434 when the rotatable platform 54 is not to be latched at the intermediate position, the hydraulic latch cylinder 444 secured to the plate 430 has a piston shaft 446 which is screwed into a threaded bore in a latch pull block 448. A screw 450 extends through an elongated vertical slot in the pull block 448 into a threaded aperture in the plate 430 to guide the pull block 448 for vertical movement under control of the hydraulic cylinder 444. A spring 452 surrounding the piston shaft 446 biases the pull block 448 normally upward to the position illustrated in FIGS. 11-13.

When hydraulic fluid is gated to hydraulic cylinder 444, the piston shaft 446 is forced downwardly, pulling the pull block 448 downwardly until the top of its elongated slot abuts the screw 450. The pull block 448 contains a pair of side recesses which define a T-shaped top having a pair of arms 456 which abut a pair of pins 458 fixedly secured to the pair of latches 434. The pair of pins 458 are biased against the arms 456 by a pair of dowels 460 slidable within vertical bores in the pull block 448. The opposite ends of the dowels 460 are biased by springs 462 upwardly against the pins 458. A pair of plugs 464 capture the springs 462 within the vertical bores.

As hydraulic latch cylinder 444 moves the pull block 448 downwardly, the arms 456 push downwardly against the pins 458, rotating the pair of latches 434 about the pivot pins 436 to a position in which the tops of the latches do not intersect the plane of the stop key 410 as it is rotated by the rotatable platform. When the rotatable platform is being indexed between 180° positions in which the rails extend transversely of the car, the cylinder 446 remains actuated so that the stop key 410 cannot be engaged.

When the rotatable platform is to be latched at its intermediate position, hydraulic fluid is diverted out of cylinder 444 and the spring 452 returns the pull block 448 to its upper position. This tilts up the pair of latches 434. As the stop key 410 approaches the latch mechanism, the indexing motor is decelerated due to actuation of deceleration switch 422, and the stop key 410 creeps towards one of the latches. As the stop key 410 strikes the inclined surface of one the latches 434, the latch is forced downwardly, with its attached pin 458 pushing the spring biased dowel 460 into the vertical bore in the pull block. The stop key 410 is thus allowed to ride over the latch, as illustrated by the dashed lines in FIG. 12. Upon passing the latch 434, the spring biased dowel 460 returns the latch to its tilted up position. The stop key 410 continues to rotate past the center located position until it strikes the stop surface of the opposite upright latch 436. The stop key 410 is now captured between the stop surfaces of the pair of latches.

As the stop key 410 reached the center latch position, pin 412 engaged the roller actuator 470 of a stop switch 472 which is secured by a bracket 474 to the plate 430. When switch 472 is actuated at the same time that the hydraulic cylinder 444 has been de-energized, a solenoid valve SV3 (FIG. 15b) is deactuated to block a pair of hydraulic lines to the hydraulic index motor 134. This terminates power to the index motor 134 as the stop key 410 stops against the opposite latch 434, as previously described.

When the rotatable platform 54 is to be rotated away from the intermediate latched position, hydraulic latch cylinder 444 receives hydraulic pressure, pulling the piston downwardly and thus retracting the pull block 448. This in turn rotates both pair of latches 434 out of engagement with the stop key 410, allowing the index motor 134 to rotate the platform. To detect that hydraulic latch cylinder 444 and its associated pull block are operating properly, a switch 480, FIGS. 10 and 11, is secured to the plate 430 and has a roller actuator 482 located to abut either a lower pin 484 or an upper pin 486 extending outward from the pull block 448. The switch 480 thus indicates whether the pull block is up or down.

HYDRAULIC SYSTEM

Figure 15B:
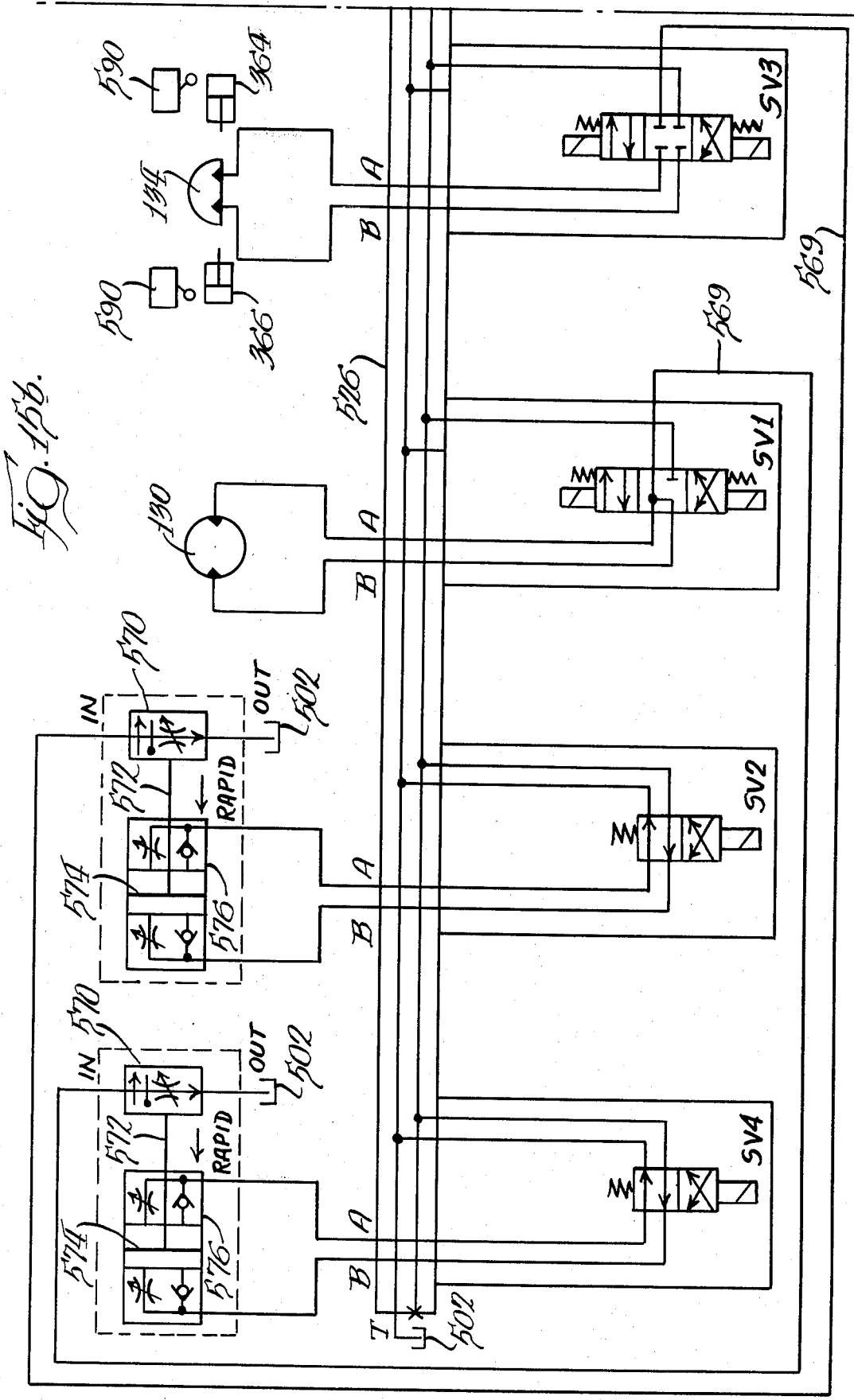

Turning to FIGS. 14 and 15a–15b the hydraulic compartment 140 and the hydraulic circuit are shown in detail. The tubular frames 110 are sealed by crosswalls 500, only two of which are illustrated in FIG. 14, to form enclosed tanks or reservoirs 502 for storing hydraulic fluid. A crosspipe 504 interconnects the pair of reservoirs 502. A strainer 506, centrally located within one reservoir 502, is coupled through a pipe 508 to a 90° elbow 510 located external to the car on the rear side wall thereof. A nipple 512 and a second 90° elbow 514 connect the elbow 510 to a pump intake pipe 516 leading to the hydraulic pump 142.

Hydraulic pump 142 is driven by an AC motor 520 which is powered from the overhead trolley system. The output from the pump 142 travels through a fine filter 522 and a pump discharge pipe 524 to a manifold 526 to which are mounted a plurality of solenoid valves SV. The output or tank T side of a manifold 526 discharges fluid into the reservoir 502.

The rear bumper post 118 is slidably suppoted within a pair of plunger bearings 530 and 532. At the end of post 118, an enlarged ring detent 534 is secured thereto, which engages a spring biased plunger 536 of a detent 538 which prevents sliding movement of the bumper post 118 beyond the detent 538 until the bumper strikes an obstacle. Upon striking an obstacle, the post detent 534 will snap past the plunger 536 and the bumper post will slide inwardly until the vehicle is brought to a halt due to de-energization of the DC motor and actuation of the caliper brake 312.

When the post detent 534 travels past the plunger 536, an actuator 542 of a valve 544 releases the caliper brake 312. At the same time, the post detent strikes the actuator 546 of an electric switch 548 which terminates power to the DC motor. At the front end of the car, the bumper post 118 located therein has a similar pipe detent 534 in engagement with a spring loaded plunger 536, and a similar valve 544 and electric switch 548 (not illustrated).

Turning to FIG. 15a, the hydraulic circuit is illustrated in detail. The pressure port P of the manifold 526 is coupled by a check valve 554 to a four-way, two-position solenoid valve SV7. The A port output from SV7 is normally coupled through the three-way, two-position valve 544 to the caliper brake 312, thereby maintaining the brake pads out of contact with the brake disc.

When one of the bumpers strike an obstruction, its actuator 542 will shift the associated valve 544, connecting the brake 312 to tank 502 and thereby discharging hydraulic fluid to release the spring loaded brake. Should a different emergency indicator detect a problem which requires an emergency stop, solenoid valve SV7 is energized to discharge hydraulic fluid from the brake 312 to tank T.

Rail clamp brake 370 is coupled through the A port of a four-way, two-position solenoid valve SV6. The P port of SV6 is coupled through a pressure reducing valve 560 to the pressure line P of the manifold. Normally the brake 370 is coupled to tank T and engaged. When rail extension is called for, solenoid valve SV6 is energized, thereby connecting the pressure line P to the clamp brake 370 for releasing the drive of the rail motor 130.

Intermediate latch solenoid 444 is coupled through a four-way, two-position valve SV5 to the manifold 526. When solenoid valve SV5 is actuated, the pressure P line of the manifold is coupled to the A port for retracting piston shaft 446 into the cylinder and thereby retracting the pair of latches 434, FIG. 12. To release the latches in order to maintain the rotary table 54 in its intermediate latched position, the solenoid valve SV5 is de-energized.

Hydraulic rail motor 130 and hydraulic index motor 134 are both connected to four-way, three-position valves, FIG. 15b. The T port of each valve does not return to the T line of manifold 526, but rather is coupled to separate flow controls 570 which have an output to the tank 502. Each flow control 570 has a variable orifice controlled by a pinion which meshes with a rack 572 moved by a piston 574 of a hydraulic cylinder 576. Each hydraulic cylinder 576 has two check valves, one of which allows hydraulic pressure to flow unobstructed against one side of the piston 574, and two variable orifices, one of which is on the output side of the piston 574 for controlling discharge in accordance with the setting of the variable orifice. The cylinder 574 associated with the index motor 134 is controlled by a four-way, two-position solenoid valve SV2. The hydraulic cylinder 576 associated with rail motor 130 is controlled by a four-way, two position solenoid valve SV4.

As seen in FIG. 14, each of the solenoid valves SV1 and SV3 have a tapping plate 580 which connects the T port of the associated solenoid valve to valve manifolds 582, which are vertically stacked within the hydraulic compartment 140 (and hence only one of which is seen in FIG. 14). Mounted on each manifold 582 is the flow control 570, the output of which flows through a tank line in the manifold 582 to a discharge line 584 connected to the reservoir 502. A housing 586 is mounted to the flow control 570 and contains the rack 572 of the cylinder 576, and the pinion of the flow control 570 which is meshed in engagement with the rack.

Returning to FIG. 15b, rail motor 130 is a bidirectional hydraulic motor whose direction of rotation is controlled by a four-way, three-position valve SV1. When the pair of rails are centered on the rotatable platform and are to be extended, one of the solenoids in SV1 is actuated along with solenoid SV4. The actuated solenoid in SV1 controls the direction of rotation of motor 130. As hydraulic fluid leaves the motor, it is coupled through line 569 to the flow control 570 before being discharged to tank 502. As solenoid SV4 is actuated, the pressure P line coupled to the A port causes the cylinder 574 to move to the left, as indicated by the arrow labeled "rapid". The orifice illustrated to the left in FIG. 15b is adjusted to control the acceleration ramp, thereby providing control over the acceleration of the rails 50.

As the pair of rails reach the extended position, limit switches within housing 380, FIG. 4, cause solenoid SV4 to be de-energized. This connects the T line of the manifold 526 to the B port, thereby driving the piston 574 toward the opposite variable orifice, which is set to control the deceleration characteristics. This in turn restricts the variable orifice of flow control 570 and causes the rail motor 130 to decelerate as the rails approach a fully extended position.

When the limit switch in housing 380 detects that rails are fully extended, pressure is maintained on the hydraulic motor, holding the rails against the stop in the station. The limit switch, after a short time delay, initiates sequencing of the fixture on a machine or the set-up station.

Index motor 134 may be an oscillating motor having a vane in a cylinder for rotation slightly greater than 180°. When the platform 54 is to be rotated, one of the solenoids in the four-way, three-position valve SV3 is actuated to connect the A and B ports in the proper direction for rotating the oscillating motor 134. At the same time, solenoid valve SV2 is actuated so that the P line of the manifold 526 is connected to the A port, thereby moving the associated piston 574 to the left. The variable orifice located to the left in cylinder 576 is adjusted to control the acceleration of the index motor. When the piston 574 is moved fully to the left, the variable orifice in flow control 570 is opened to its maximum extent so that the rotatable platform will move at its maximum speed towards its desired postion.

Assuming the rotatable platform is being indexed for a rail extension, the index motor 134 continues to be driven at full speed so that lug 360, FIG. 4, strikes the associated shock absorber 354 or 356 at full speed. The shock absorber in turn decelerates the rotating platform into position against a stop. Pressure is maintained on index motor 134 to hold the platform against the stop. When the variable platform reaches the precise position for rail extension, a limit switch 590, FIG. 15b, is actuated, initiating release of brake 370 and extension of rails.

If the rotataing platform was to be latched at its center travel position, then solenoid valve SV2 is de-energized at the time the deceleration switch 422, FIG. 10, detects the deceleration cam 152. De-energization of valve SV2 connects port B to the P line of the manifold 526, thereby driving piston 574 to the right and restricting the orifice in the flow control 570 to thereby decelerate the index motor 134. As the decelerating rotatable table 54 reaches the center position, switch 472, FIGS. 10-11, is actuated and causes de-energization of solenoid valve SV3 which returns to its center position, blocking the motor 134 against further rotation (at the same time the latches 434 will have trapped the lock key 410 in the center position).

SET-UP STATION

Figure 16:
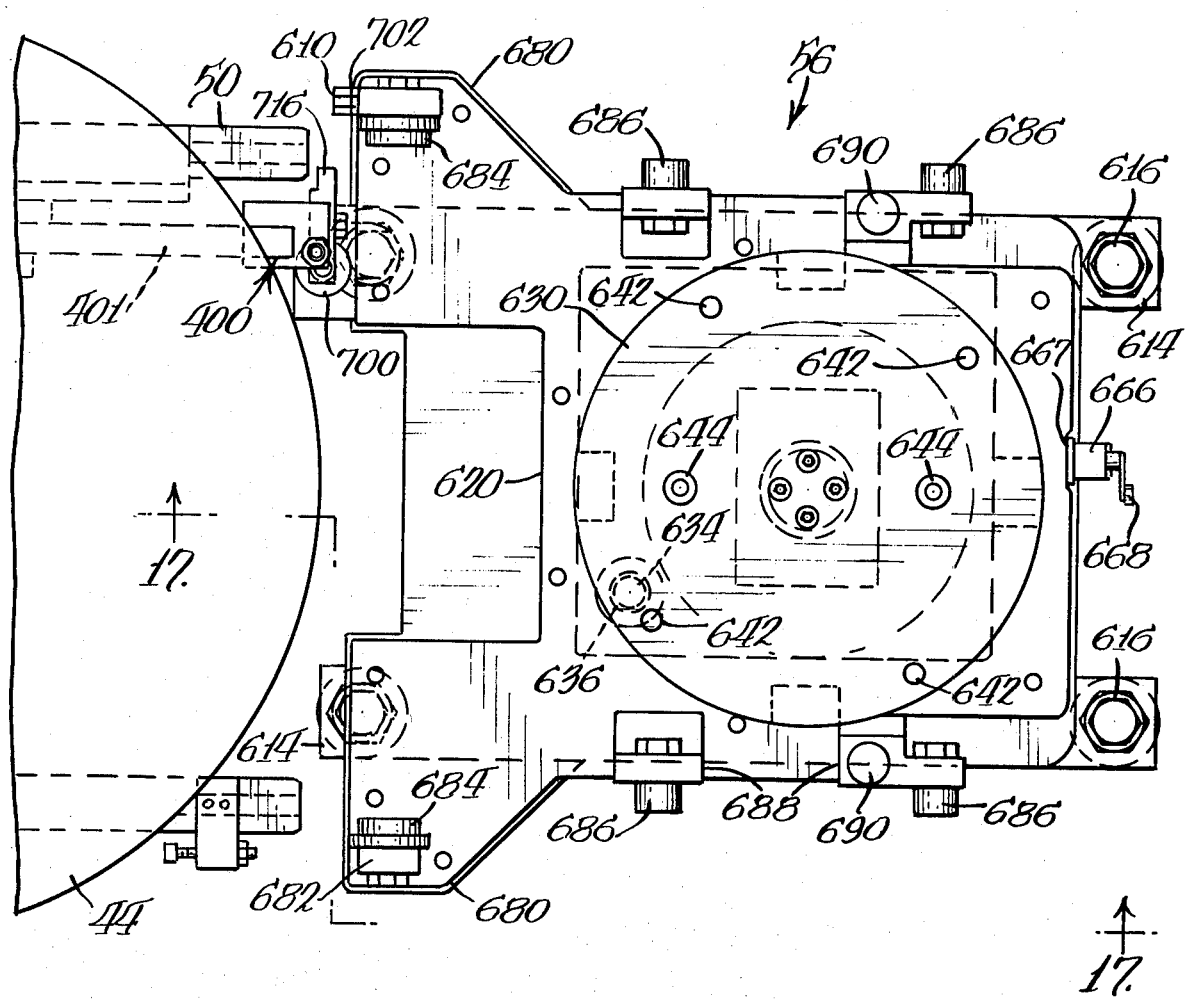
FIG. 16 is a top plan view of the set-up station of FIG. 1 and the car pallet changer located to deposit a pallet thereon.

Turning to FIGS. 16-18, the set-up station 56 and the rail stop 400 on the car pallet changer are illustrated in detail. Station 56 includes a frame 612 having flanges 614, FIGS. 16 and 17, which mount leveling screws 616 which adjust the height of the frame above pads 618 secured to the floor. A stepped horizontal platform 620 is welded to the frame 612 and fixedly mounts a plurality of upright support blocks 622. A lift plate 630, which can be vertically elevated by an elevator in the form of a hydraulic cylinder 632, rests in its lowered position on the upright support blocks 622. A guide pin 634 fixedly secured to the bottom of the lift plate 630 is slidably captured within an annular guide bearing 636 in the platform 620 for preventing rotation of the lift plate 630 as it is vertically reciprocated by the hydraulic cylinder 632.

Pallet 44 has on its bottom an annular Curvic coupling which rests on pads 642 secured to the lift plate 630. The lift plate 630 also has a pair of alignment pins 644 which extend into alignment sockets on the bottom of the pallet 44. The details of the pallet 44 (as well as the details of a mating indexing pallet carrier on a machine tool) are shown in a patent application to Blomquist, Ser. No. 595,338, filed July 14, 1975, now U.S. Pat. No. 3,986,617 issued Oct. 19, 1976, entitled "Indexing Pallet Carrier for Machine Tools", the contents of which have been incorporated by reference herein. Other types of pallets could of course be substituted with corresponding changes in the pallet changer mechanism.

Hydraulic cylinder 632 is affixed to the platform 620 and has a piston extending upward in engagement with the lift plate 630. The shaft 650 of the piston also extends downwardly and carries a down dog 652 and an up dog 654 which abut a roller actuator 656 of a limit switch 658. The limit switch 658 is secured by a bracket 660 to the frame of the hydraulic cylinder 632. A spring 662 is captured between the bottom of the hydraulic cylinder 632 and a lock nut 664 secured to the shaft 650. As the hydraulic cylinder 632 moves the lift plate 630 between its lowermost position, resting on support blocks 622, and its maximum vertical position, the switch actuator 656 will engage the down dog 652 and the up dog 654, respectively, to provide an electrical indication of the position of the lift plate 630. A limit switch 666 is secured by a bracket 667 to the back of the platform 620. Switch 666 has a roller actuator 668 which engages the bottom of a pallet when resting on lift plate 630 to provide a pallet present indication when the hydraulic cylinder 632 is fully retracted.

Frame 612 includes a plurality of L-brackets 670 which support a raised grill or floor 672 for the operator. The raised floor 672 makes it easier for the operator to fixture a workpiece to the top of the pallet 44, or to remove a workpiece therefrom. As is conventional, the top of the pallet 44 includes a plurality of elongated slots (see FIG. 1) in which clamps may be secured so as to fixture a workpiece to the pallet.

Platform 620 includes a pair of horizontal corner extensions 680 which extend beyond the radius of any pallet centered on the lift plate 630. A pair of upright brackets 682 at the ends of the corner extensions 680 each carry a guide roller 684 (see also FIG. 1) for supporting the outer sides of the pair of I-beam rails 50 when extended into the set-up station 56. On each side of the platform 680, a pair of guide support rollers 686, rotatably mounted on brackets 688 secured to the platform 620, support the bottom of the I-beam 50 when extended into the station. An inner side guide roller 690, one located on each side of the platform 620, are rotatably mounted to the top of the rear bracket 688 for engaging the bottom, inner side of the I-beams 50.

To allow rail extension only when the pair of rails 50 are properly aligned with the set-up station, a truncated conical cam 700 is secured to a forward portion of one of the corner extensions 680. The cam 700 allows the rail stop 400 to be rotated so that the rails 50 can be extended. Also affixed to the top of one of the upright brackers 682 is the rail bumper 610 for engaging an extension on the rails 50 when the rails have been fully extended into the set-up station 56. Bumper 610 is secured by a spacer 702 to the upright bracket 682. The width of the spacer 702 is adjusted so as to precisely align the bumper 610 at the location corresponding to full rail extension. Similar bumpers 610 are located at the other set-up stations and at the pallet handling mechanisms of the machine tools. Since each of these units will be slightly offset with respect to the center of the car pallet changer 48, the spacers 702 allow an individual adjustment for each pallet handling station. Furthermore, it will be recalled that pressure is maintained on the hydraulic rail motor 130, FIG. 15b, at the end of extension so that the rails 50 extend until the extension thereon strikes bumper 610.

Turning to FIG. 18, the details of the rail stop 400 are illustrated. A movable latch 710 is rotatably secured by a screw 712 to the extension bar 401. A spring plunger 714 normally biases the latch 710 counterclockwise so that a stop flange 716 is located in the path of extension of the rail 50. If a control malfunction should cause the rail motor 130 to be actuated before the movable latch 710 is cammed out of position, the rail 50 will strike the stop flange 716 and be prevented from extending further.

A semi-spherical follower 720 on the bottom of the movable latch 710 is located to ride up on the cam 700 when the pair of rails 50 are rotated in alignment for extension into the guide rollers 684. This rotates the movable latch 710 clockwise as shown in FIG. 18, thereby moving stop flange 716 out of the path of the rail 50. After completing a pallet deposit or retrieval, the rails 50 are retracted and rotated, causing the spring plunger 714 to rotate the movable latch 710 to its stop position.

Returning to FIGS. 16 and 17, it will be assumed that a pallet 44 is on the lift plate 630 and is to be retrieved by the transfer rails 50. At this time, the piston of hydraulic cylinder 632 is fully down, as indicated by the down dog 652 abutting the actuator 656. As the pallet car 52 reaches the set-up station, the hydraulic cylinder 632 moves to the top of its stroke, causing actuator 656 to abut the up dog 654. The transfer rails 50 on the shuttle car now index 90°, causing the rail stop 400 to be rotated out of its blocking position. The empty rails now extend into the station and are guided by the rollers 684, 686 and 690. At this time, the bottom of the pallet 44 is vertically above the pads 51 on the rails 50.

Hydraulic cylinder 632 now moves to the bottom of its stroke, depositing the pallet 44 on pads 51 on the transfer rails 50. The cylinder continues to move down and brings the lift plate 630 to a clearance position in which the alignment pins 644 are located vertically below the annular coupling on the bottom of the pallet. The rails 50 now retract to a central position on the shuttle car, carrying the pallet 44 thereon. If the shuttle car is to move to a new position, the car pallet changer indexes by 90° to the intermediate latch position. However, if the pallet carried on the opposite pads 51 of the rails 50 was to be deposited at the set-up station, the car pallet changer would index 180° rather than 90°. The rails 50 would then be extended into the set-up station, carrying the second pallet into position. Hydraulic cylinder 632 would then move up to bring the lift plate 630 into engagement with the bottom of the pallet and lift the pallet off the rails 50 to a clearance position. The rails 50 would now retract to a central position on the shuttle car and rotate 90° to the intermediate travel position. When the rails 50 reached the center position on the shuttle car, the piston of the hydraulic cylinder 632 is retracted downward to its maximum down position, causing the lift plate 630 to rest in a stable position on the support blocks 622. The set-up station is now ready to manually receive a new part in the fixture on the pallet or a new fixture and part on the pallet.

At each machine tool, it will be apparent that the pallet handling mechanism must include a similar lifting mechanism for lifting the pallet off of the rails 50 and depositing a pallet on the rails 50. The remaining construction of the pallet handling mechanism can vary greatly depending on the requirements of the machine tool.

While a specific embodiment has been described above, it will be apparent that various modifications and changes can be made following the above teachings.

We claim:

1. A pallet shuttle system for transporting pallets capable of carrying workpieces thereon between a plurality of spaced pallet handling stations, comprising:
a trackway extending adjacent the plurality of pallet handling stations,
a vehicle movable along the trackway to each of the pallet handling stations and having a fixed frame,
a platform rotatably mounted on the fixed frame and connected to index motive means for rotating the platform by at least 180° with respect to the fixed frame and actuable to rotate the transfer rail means by 90° to an intermediate travel position in which the transfer rail means extend parallel to the trackway, and a latch assembly for maintaining the rotatable platform at the intermediate travel position during travel of the vehicle along the trackway,
transfer rail means slidably mounted to the rotatable platform and having at opposite ends a pair of pallet supports for retaining a pair of pallets thereon, rail motive means actuable to extend the transfer rail means outward from the vehicle to locate one of the pair of pallet supports in pallet interchanging relationship with an adjacent pallet handling station and then to retract the transfer rail means to a center position on the vehicle, the index motive means being actuable to rotate the platform by 180° to allow the rail motive means to extend the other of the pair of pallet supports outward in pallet interchanging relationship with the same adjacent pallet handling station, and the latch assembly includes a pair of latch bars each movably mounted to a block slidably mounted on the fixed frame, the pair of latch bars each being biased to deflect out of the path of travel of a stop member carried by the rotatable platform when struck by the stop member while rotating toward the intermediate travel position but being nondeflectable when struck by the stop member while rotating in the opposite direction, and retract means mounted between the fixed frame and the block for moving the block so that the pair of latch bars are retracted out of the path of the stop member when the indexing motive means is rotating the platform by 180°.

2. A pallet shuttle system for transporting pallets capable of carrying workpieces thereon between a plurality of spaced pallet handling stations, comprising:

a trackway extending adjacent the plurality of pallet handling stations, a vehicle movable along the trackway to each of the pallet handling stations and having a fixed frame, a platform rotatably mounted on the fixed frame and connected to index motive means for rotating the platform by at least 90° with respect to the fixed frame to a desired travel position, a deceleration switch mounted on one of the rotatable platforms or the fixed frame and a deceleration cam mounted on the other of the rotatable platform or the fixed frame for actuating the deceleration switch when the rotatable platform approaches the desired travel position, means for decelerating the indexing motive means upon actuation of the deceleration switch when the rotatable platform is to be positioned at the desired travel position, and transfer rail means slidably mounted to the rotatable platform and having at opposite ends a pair of pallet supports for retaining a pair of pallets thereon with rail motive means actuable to extend the transfer rail means outward from the vehicle to locate one of the pair of pallet supports in pallet interchanging relationship with an adjacent pallet handling station and then to retract the transfer rail means to a center position on the vehicle.

3. The pallet shuttle system of claim 2 wherein the indexing motive means is a hydraulic motor which rotates in response to hydraulic fluid flowing therethrough, a flow control having a variable orifice for controlling the flow of hydraulic fluid to the hydraulic motor, and means responsive to actuation of the deceleration switch for restricting the variable orifice of the flow control.

4. A pallet shuttle system for transporting pallets capable of carrying workpieces thereon comprising, a plurality of spaced pallet handling stations each including a pallet changer mechanism and a release cam associated with the pallet changer mechanism, a trackway extending adjacent the plurality of pallet handling stations, a vehicle movable along the trackway to each of the pallet handling stations and having a fixed frame, transfer rail means slidably mounted to the rotatable platform and having at one end a pallet support for retaining a pallet thereon, rail motive means actuable to extend the transfer rail means outward from the vehicle to locate the pallet support in pallet interchanging relationship with the pallet changer mechanism of an adjacent pallet handling station and then to retract the transfer rail means, a stop latch movably mounted with respect to the platform and located in the path of travel of the transfer rail means to prevent sliding extension thereof, and the release cam of the associated pallet changer mechanism being struck by the stop latch as the motive means moves the platform in alignment with the station, the release cam moving the stop latch out of the path of travel of the transfer rail means to thereby allow a pallet interchange to occur.

5. The pallet shuttle system of claim 4 wherein each of the pallet handling stations include guide means for guiding the transfer rail means over an elevating mechanism, the elevating mechanism including a lift platform which can be raised to lift the pallet off of the transfer rail means in order to thereby interchange the pallet from the vehicle to the pallet handling station.

6. The pallet shuttle system of claim 4 wherein each of the pallet handling stations includes a stop member which abuts a stop member carried on the transfer rail means to prevent further extension of the transfer rail means, and control means for the rail motive means for maintaining drive to allow the transfer rail means to continue to extend until abutment of the stop member.

7. A pallet shuttle system for transporting pallets capable of carrying workpieces thereon, comprising:

a plurality of separate, spaced pallet handling stations each having guide means aligned with a pallet changer mechanism for interchanging a pallet located by the guide means, an elongated smooth track extending adjacent the plurality of spaced stations, an elongated tooth rack parallel with the elongated track and extending adjacent the plurality of spaced stations, a vehicle including a chassis having a plurality of freely rotatable wheels on the elongated track for supporting the chassis for movement therealong, a moveable first frame having a pinion rotatably mounted thereon, said first frame being adjustable to move said pinion into and out of engagement with said toothed rack, a drive motor to drive said pinion mounted to a second frame with said second frame being adjustably mounted to said first frame, and transfer rail means slidably mounted on the chassis for extension outward into engagement with guide means of the station spaced adjacent thereto for guiding the transfer rail means over the pallet changer mechanism to interchange a pallet between the transfer rail means and the station.

8. The pallet shuttle system of claim 7 including a reference member fixed to the chassis, screw means extending from the movable frame into engagement with the reference member for adjusting the angular position of the frame with respect to the chassis, and clamp means for clamping the frame to the chassis.

9. The pallet shuttle system of claim 7 wherein the pinion includes a pinion gear meshed in engagement with the toothed rack and a pinion shaft extending therefrom, and moveable first frame includes pinion bearing means for rotatably supporting the pinion shaft, a mounting means for adjustably mounting the second frame holding the drive motor for rotating said shaft, and eccentric mount means for rotatably mounting the removable frame about an axis offset from the axis of the pinion shaft so that angular adjustment of the frame allows the pinion to be meshed in closer engagement with the toothed rack to reduce backlash.

10. The pallet shuttle system of claim 9 wherein the drive motor comprises an electric motor rotating a toothed drive gear, the pinion shaft carries a toothed driven gear, a toothed belt meshing with the drive gear and the drive gear, and an encoder coupled to the electric motor for indicating the position of the vehicle along the toothed rack.

11. The pallet shuttle system of claim 7 including a pair of parallel extending smooth tracks, the toothed rack being mounted to one of the pair of tracks with the pinion being mounted off-center of the vehicle, the chassis has axles for rotatably mounting at least four wheels supporting the chassis for movement along the pair of tracks, and means for preventing skewed movement of the vehicle along the pair of tracks at the chassis is driven by the pinion.

12. The pallet shuttle system of claim 7 wherein the transfer rail means has at opposite ends a pair of pallet supports for retaining a pair of pallets thereon, rail motive means actuable to extend the transfer rail means outward from the vehicle to locate one of the pair of pallet supports in pallet interchanging relationship with the station and then to retract the transfer rail means to a center position on the vehicle, a platform rotatably mounted to the chassis and connected to index motive means for rotating the platform 180° with respect to the chassis, the transfer rail means being slidably mounted to the rotatable platform and indexable by 180° by the index motive means to allow the rail motive means to extend the other of pallet supports outward in pallet interchanging relationship with the same station.

13. A pallet shuttle system for transporting pallets capable of carrying workpieces between a plurality of spaced pallet handling stations each having a pallet changer mechanism for interchanging pallets between the stations and the shuttle system, comprising:
 a trackway extending adjacent the plurality of pallet handling stations,
 a vehicle having a chassis mounting a drive motor for moving the vehicle along the trackway to each of the stations, transfer rail means slidably mounted on the chassis and driven outward by a rail motor to locate a pallet carried on the transfer rail means in interchanging relationship with the pallet changer mechanism at the adjacent station,
 a fluid reservoir on the chassis for containing hydraulic fluid, a pump motor for driving a hydraulic pump mounted on the chassis to provide the hydraulic fluid under pressure to at least one of the motors of the vehicle, and
 electric coupling means for coupling an external source of electric power to the vehicle for operating at least a different one of the motors thereon.

14. The pallet shuttle system of claim 13 wherein the transfer rail means have a pair of pallet supports thereon for supporting a pair of pallets at opposite ends of the transfer rail means, the transfer rail means are slidably mounted on a platform rotatably mounted by a bearing to the chassis, an index motor is mounted to the chassis for rotating the platform by 180° to allow interchange between both of the pair of pallet supports, the index motor being hydraulic and coupled to the hydraulic pump.

15. The pallet shuttle system of claim 14 including a hydraulically controlled latch for maintaining the rotatable platform at a 90° intermediate travel position in which the transfer rail means are parallel to the trackway during travel of the vehicle along the trackway, and means coupling the hydraulic pump to the hydraulic latch.

16. The pallet shuttle system of claim 13 wherein the electric coupling means couples electric power to the drive motor and to the pump motor, and the hydraulic pump is coupled to the rail motor.

17. The pallet shuttle system of claim 16 including an elongated toothed rack extending parallel to the trackway, the chassis includes axles on which wheels are freely rotatably mounted for supporting the chassis above the trackway, and the drive motor includes a pinion meshed in engagement with the toothed rack to drive the vehicle along the trackway.

18. The pallet shuttle system of claim 13 wherein the electric coupling means includes an overhead duct suspended above the trackway and containing an elongated electric bus, and the chassis includes an upright standard extending into the duct and having a collector assembly in slidable engagement with the electric bus to couple electric power to the vehicle.

19. The pallet shuttle system of claim 18 wherein the overhead duct contains a second elongated electric bus separate from the first named electric bus for transmitting electric control signals, and the upright standard includes a second collector assembly in slidable engagement with the second electric bus to couple the electric control signals to the vehicle.

20. The pallet shuttle system of claim 18 for use in a chip and oil filled atmosphere surrounding the pallet shuttle system wherein the overhead duct includes an enlarged head fixedly mounting the electric bus and containing the collector assembly and a narrow neck of substantially smaller width than the enlarged head for providing external access to the duct, the upright standard extending through the narrow neck and mounting the collector assembly at the end thereof.

21. The pallet shuttle system of claim 13 wherein the chassis includes at least one tubular frame extending along the length of the vehicle, and side walls means for sealing a portion of the tubular frame to create the reservoir for holding hydraulic fluid therein.

22. The pallet shuttle system of claim 21 including a second tubular frame spaced from the first named tubular frame, cross members secured to the pair of tubular frames to define a portion of the chassis, the second tubular frame including sidewall means for sealing a portion of the tubular frame to define a further reservoir for holding hydraulic fluid therein, and a cross pipe for interconnecting the sealed portions of the pair of tubular frames.

23. The pallet shuttle system of claim 22 wherein the first and second tubular frames define therebetween a hydraulic compartment for containing the hydraulic pump and pump motor, an access cover for covering the hydraulic compartment, means defining a cage for containing an operator carried on the vehicle, the cover being located within the operator cage.

\* \* \* \* \*